United States Patent
Kaufman et al.

(10) Patent No.: US 12,216,462 B2
(45) Date of Patent: *Feb. 4, 2025

(54) SYSTEMS AND METHODS FOR GENERATING A FACILITIES REPORT

(71) Applicant: VFA, INC., Austin, TX (US)

(72) Inventors: Lee Kaufman, Grafton, MA (US); Mark Ayasse, North Easton, MA (US); Raymond Johnson, Woburn, MA (US); Raymond Dufresne, Salem, NH (US); Scott Cormier, North Attleboro, MA (US); Vlad Mangeym, Sherborn, MA (US)

(73) Assignee: VFA, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,321

(22) Filed: May 10, 2021

(65) Prior Publication Data

US 2021/0263510 A1   Aug. 26, 2021

Related U.S. Application Data

(63) Continuation of application No. 13/835,984, filed on Mar. 15, 2013, now Pat. No. 11,048,244, which is a continuation-in-part of application No. 13/741,027, filed on Jan. 14, 2013, now Pat. No. 8,612,277, which is a continuation of application No. 12/690,468, filed on Jan. 20, 2010, now Pat. No. 8,433,600, which is a continuation-in-part of application No. 11/875,518, filed on Oct. 19, 2007, now Pat. No. 8,428,994.

(51) Int. Cl.
G05B 23/00 (2006.01)
G06Q 10/0631 (2023.01)
G06Q 30/0203 (2023.01)

(52) U.S. Cl.
CPC ....... *G05B 23/00* (2013.01); *G06Q 10/06315* (2013.01); *G06Q 30/0203* (2013.01)

(58) Field of Classification Search
CPC ............ G05B 23/00; G06Q 10/06315; G06Q 30/0203
USPC ...................................................... 705/7.11
See application file for complete search history.

(56) References Cited

U.S. PATENT DOCUMENTS

| | | | |
|---|---|---|---|
| 4,642,780 A | 2/1987 | Thomson | |
| 4,947,322 A | 8/1990 | Tenma et al. | |
| 5,091,869 A | 2/1992 | Ingram et al. | |
| 5,189,606 A * | 2/1993 | Burns | G06Q 10/06 705/7.37 |
| 5,680,305 A * | 10/1997 | Apgar, IV | G06Q 10/06375 705/7.29 |
| 5,689,705 A * | 11/1997 | Fino | G06Q 50/163 |
| 6,038,547 A | 3/2000 | Casto | |

(Continued)

OTHER PUBLICATIONS

Love, et al., "A stopping rule for Facilities Location Algorithms", McMaster University, pp. 1-19, Sep. 1980 (Year: 1980).*

(Continued)

*Primary Examiner* — Amber A Misiaszek
(74) *Attorney, Agent, or Firm* — Polsinelli LLP

(57) ABSTRACT

Systems and methods for generating a facilities report for a property. A computer can receive survey data from the mobile device. A facilities report for the property can be generated based on the survey data.

20 Claims, 48 Drawing Sheets

(56) References Cited

U.S. PATENT DOCUMENTS

| | | | |
|---|---|---|---|
| 7,058,544 | B2 | 6/2006 | Uzarski et al. |
| 7,195,150 | B2 | 3/2007 | Battagin et al. |
| 7,269,250 | B2 | 9/2007 | Burkett et al. |
| 7,734,488 | B2 | 6/2010 | Grussing et al. |
| 2002/0062277 | A1 | 5/2002 | Foster et al. |
| 2004/0236620 | A1* | 11/2004 | Chauhan ........ G06Q 10/063112 705/7.14 |
| 2005/0273346 | A1 | 12/2005 | Frost |
| 2008/0092061 | A1 | 4/2008 | Bankston et al. |
| 2008/0208962 | A1* | 8/2008 | Kim ........................ H04L 67/12 342/357.52 |
| 2008/0255862 | A1* | 10/2008 | Bailey .................... G06Q 40/06 707/999.107 |
| 2009/0106292 | A1 | 4/2009 | Kaufman et al. |
| 2013/0197961 | A1* | 8/2013 | Kaufman ........... G06Q 30/0203 705/7.25 |
| 2014/0172513 | A1* | 6/2014 | MacLean ............. G06Q 30/018 705/7.39 |
| 2015/0312773 | A1* | 10/2015 | Joshi ..................... H04W 16/18 370/252 |

OTHER PUBLICATIONS

U.S. Appl. No. 13/835,984, US 2013-0211787 A, filed Mar. 15, 2013, U.S. Pat. No. 11,048,244.

U.S. Appl. No. 13/741,027, US 2013-0197961 A1, filed Aug. 1, 2013, U.S. Pat. No. 8,612,277.

U.S. Appl. No. 12/690,468, US20100138261A1, filed Jun. 3, 2010, U.S. Pat. No. 8,433,600.

U.S. Appl. No. 11/875,518, US 2009/0106292 A1, filed Apr. 23, 2009, U.S. Pat. No. 8,428,994.

S. Madanat et al., "Estimation of Infrastucture Transition Probabilities From Condition Rating Data", Journal of Infrastructure Systems, Jun. 1995, vol. 1, No. 2, pp. 120-125.

International Search Report and Written Opinion issued in International Application No. PCT/US2010/023005 dated Apr. 8, 2010 (7 pages).

Quirk, "The Facilities Condition Index—as a measure of the conditions of public universities as perceived by end users", Sep./Oct. 2006 Facilities manager, www.apap.org, pp. 62-69 http://www2.bakersfieldcollege.edu/nstrobel/collegecouncil/facilitiesconditionindex-appa.pdf.

NOAA Web Questionneire Overview, Aug. 2, 2005 (2 pages).

NOAA Web-Based Questionnaire—Kickoff Meeting; Oct. 5, 2004, 30 pages, copyright VFA 2004.

NOAA Web-Based Questionnaire Project, Copyright 2004 by VFA, Inc. (19 pages).

VFA Software Solutions; VFA.auditor-Guided Facility Evaluations; Copyright 2006 VFA, Inc. (2 pages).

VFA Facilities Management and Capital Planning Solutions—Press Release: VFA Introduces VFA.auditor for Guided Facility Evaluations; Mar. 7, 2006, Copyright 2006 VFA, Inc. (2 pages).

VFA—Best Approaches for Auditing Facility Condition Across Large Real Estate Portfolios, Mar. 27, 2006 (2 pages).

VFA.Auditor, Apr. 3, 2006 (18 pages).

VFA.auditor Overview—Software Solutions—Capital Asset Management Software; Copyright 2006 VFA, Inc. (2 pages).

Office Action issued in Canadian Application No. 2,787,629 dated Jul. 14, 2015.

Office Action issued in Canadian Application No. 2,607,404 dated Feb. 2, 2016.

Office Action issued in Canadian Application No. 2,844,010 dated Oct. 28, 2015.

Love et al., "A Stopping rule for Facilities Location Algorithms", American Institute of Industrial Engineers, AIIE Transactions, 13(4), pp. 357, (1981).

* cited by examiner

— 126

VFA.auditor

Section: 1.0 Building Information                                    Not Started Please review the information in this section, and correct any inaccuracies by modifying the information in the Update column. *The results of this survey are based on the information in this section, so it is critical that it be as accurate as possible.*

Asset Info
Property Name:   Bensam Building
Property ID:     91200

Location
Address:    266 summer st
City:       Boston
State:      MA
Country:    UNITED STATES OF AMERICA
Zipcode:    02210

Construction Info
Asset Type:            Building
Asset Use:
Construction Type:
Historic Designation:
City Cost Index:       NORFOLKVA

Configuration Information

|  | On File | Update |
|---|---|---|
| Area (SF): | 25000 | 25000 |
| Floors: | 3 | 3 |
| Year Constructed: | 2005 | 2005 |
| Year Renovated: | | |

VFA.auditor

Section: 2.0 Substructure – Footings and Foundations          Not Started
The substructure of buildings is comprised of footings and foundations, which typically extend underground to some degree. The substructure transmits the building's weight loads to the underlying ground, keeping the building level and reducing settling. When properly designed, there should be little or no cracking in the foundation and no water leaks.

Note: Some substructures include basement walls, which should be asserted in Section 3.0 – *Basement Walls*.

Need more information about this section? <u>See the Glossary</u>.

1. If the substructure cannot be assessed, select the checkbox and continue to the next section.

☐

2. Enter the square footage of concrete footing and foundation with visible cracks or chips that require repair (if none, enter "0"):

0_____ SF Concrete

3. Based on the condition of the substructure, assign a priority for corrective work:
    ○ Priority 1: Critical (as soon as possible or within 1 year)
    ○ Priority 2: Threatening (may become critical in 1 to 2 years)
    • Priority 3: Existing (may become critical in 3 to 5 years)

4.    Comments:

VFA.auditor

Section: 3.0 Basement Walls                                  Not Started
Basement walls are vertical structure elements in the usable portion of the building that is partly or completely below the ground. These elements include perimeter walls that appear to be structural, and structures such as columns and posts.

Need more information about this section? <u>See the Glossary.</u>

1. If there are no basement walls (if the foundation is slab-on-grade), or if the basement walls cannot be assessed, select the checkbox and continue to the next section.

☐

2. Enter the square footage of concrete basement walls with visible cracks or chips that require repair (if none, enter "0"):

0_____SF Concrete

3. Enter the square footage of brick, concrete masonry, or stone basement walls that require repointing, resetting, or resealing:

☐Not Applicable/ No Cost to Repair
   0_____ SF Brick – Repair
   0_____SF Concrete Masonry Unit   Repair
   0_____SF Stone – Repair
   0_____SF Brick – Replace Portion / Make Watertight
   0_____SF Concrete Masonry Unit – Replace Portion/Make Watertight 4. Based on the condition of the basement walls, assign a priority for corrective work:
   o Priority 1: Critical (as soon as possible or within 1 year)
   o Priority 2: Threatening (may become critical in 1 to 2 years)
   • Priority 3: Existing (may become critical in 3 to 5 years)

5. Comments:

FIGURE 7

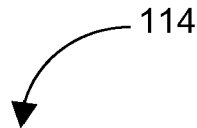

VFA.auditor

Section: 4.0 Floor and Roof Deck Construction                        Not Started
Floor Construction is at the horizontal division between two stories of a building. Roof Deck Construction is the structural component that supports and insulates the roof covering.

Note: This section deals with the condition of the building's superstructure. Floor Construction does not include the floor finishes (*see Section 12.0 – Interior Floor Finishes*). Roof Deck Construction does not include the roof covering (*see Section 8.0 – Roofing*).

Tip: Deck surfaces are often covered and may be easily observed. To assess the condition, try looking in closets, mechanical rooms, and other spaces that do not have floor finishes.

Need more information about this section? <u>See the Glossary.</u>

1. If the floor and roof constructions cannot be assessed, select the checkbox and continue to the next section.

☐

2. Enter the square footage of concrete floor and roof deck with visible cracks or chips that requires repair (if none, enter "0"):

0_____SF Concrete

3. Enter the square footage of wood floor and roof deck that requires replacement (if none, enter "0").
    0_____SF Wood 4. Based on the condition of the floor and roof decks, assign a priority for corrective work
    o Priority 1: Critical (as soon as possible or within 1 year)
    o Priority 2: Threatening (may become critical in 1 to 2 years)
    • Priority 3: Existing (may become critical in 3 to 5 years)

5. Comments:

VFA.auditor

Section: 5.0 Exterior Walls                                                     Not Started
The exterior walls are the "outside" walls that vertically enclose the building.

Tip: Do not enter the "same" square footage in more than one question. Select the most appropriate remedy for the condition.

Need more information about this section? <u>See the Glossary.</u>
1. Enter the square footage of each type of exterior wall that requires repointing (if none, enter "0"):

☐ Not Applicable/ No Cost to Repair
    0_____SF Brick Veneer or Brick
    0_____SF Concrete Brick
    0_____SF Stone
    0_____SF Stone Veneer
    0_____SF Precast Concrete Panels
2. Enter the square footage of brick veneer, brick, concrete block, stone, stone veneer, or poured-in-place concrete exterior walls with cracks or chips that require repair (if none, enter "0"):
    0_____SF Exterior Walls
3. Enter the square footage of wood siding that requires repair or minor board replacement (if none, enter "0"):
    0_____SF Wood Siding
4. Enter the square footage of each exterior wall type that requires replacement:

☐ Not Applicable/ No Cost to Repair
    0_____SF Wood Siding
    0_____SF Vinyl or Aluminum Siding
    0_____SF EIFS (Exterior Insulation and Finish System)
5. Enter the square footage of brick veneer, brick, concrete block, poured-in-place concrete, wood, vinyl, or aluminum exterior walls with dirt, graffiti, mold, etc. that requires cleaning (if none, enter "0"):
6. Enter the square footage of brick veneer, brick, concrete block, poured-in-place concrete, or wood exterior walls that requires painting or waterproof sealing (if none, enter "0"):
    0_____SF Exterior Walls
7. Enter the linear footage of wood exterior trim that requires painting or waterproof sealing (if none, enter "0"):
    0_____LF Wood Trim
8. Based on the condition of the floor and roof decks, assign a priority for corrective work
    ○ Priority 1: Critical (as soon as possible or within 1 year)
    ○ Priority 2: Threatening (may become critical in 1 to 2 years)
    • Priority 3: Existing (may become critical in 3 to 5 years)

VFA.auditor

Section: 6.0 Exterior Windows                                           Not Started

An exterior window is a glass or glazed opening in an exterior wall that admits light and air.

Tip: In the condition of each window cannot be easily observed, estimate the condition based on the windows that can be observed.

Need more information about this section? <u>See the Glossary.</u>

1  Enter the square footage of each type of exterior window that requires repair, refinish, or replacement:

☐ Not Applicable/ No Cost to Repair
    0_____SF Aluminum - Repair
    0_____SF Aluminum - Replace
    0_____SF Steel - Refinish
    0_____SF Steel - Repair
    0_____SF Steel - Replace
    0_____SF Vinyl - Replace
    0_____SF Wood - Refinish
    0_____SF Wood - Repair
    0_____SF Wood - Replace 2. Based on the condition of the exterior windows, assign a priority for corrective work:
    - ○ Priority 1: Critical (as soon as possible or within 1 year)
    - ○ Priority 2: Threatening (may become critical in 1 to 2 years)
    - ● Priority 3: Existing (may become critical in 3 to 5 years)

3. Comments:

VFA.auditor

Section: 7.0 Exterior Doors                              Not Started
An exterior door is a swinging or sliding barrier in an outer wall or vertical enclosure that provides a means to access or egress the building.

Tip: This survey assumes a single exterior door measure approximately 3 feet by 7 feet. A set of double doors counts as 2 doors.

Need more information about this section? See the Glossary.

1. Enter the number of exterior doors that require repair work such as painting/refinishing, caulking, alignment, hinge replacement, or lock repair (if none, enter "0"):
   0_____Exterior Doors
2. Enter the number of each type of exterior door that is damaged or inoperable and requires replacement:

☐Not Applicable/ No Cost to Repair
   0_____Wooden Doors
   0_____Aluminum Doors
   0_____Steel Doors
   0_____SF Overhead Steel Roll-ups, without motor
   0_____SF Powered Steel Overhead Roll-ups
   0_____SF Powered Wooden Overhead Roll-ups

Tip: Enter the area in square feet for each type of roll-up door

3. Based on the condition of the exterior doors, assign a priority for corrective work:
   o Priority 1: Critical (as soon as possible or within 1 year)
   o Priority 2: Threatening (may become critical in 1 to 2 years)
   • Priority 3: Existing (may become critical in 3 to 5 years)

4. Comments:

VFA.auditor
Section: 8.0 Roofing                                                                 Not Started
A roof is comprised of a material used to cover the roof framing (roof deck) of a building to prevent the ingress of weather into the building interior.

Need more information about this section? See the Glossary.

1. Enter the square footage of each type of sloped/pitched roof that requires replacement:
   ☐ Not Applicable/ No Cost to Repair
   0_____SF Asphalt Shingles
   0_____SF Standing Metal Seam
   0_____SF Slate or Synthetic Slate
   0_____SF Clay Tile 2. Enter the square footage of each type of flat roof that requires replacement:
   ☐ Not Applicable/ No Cost to Repair
   0_____SF Adhered Membrane
   0_____SF Ballasted Membrane
   0_____SF Pavers
   0_____SF Built-up Tar
   0_____SF Concrete Roof Panel 3. Enter the square footage of roof flashing that requires replacement (if none, enter "0"):
   0_____SF Roof Flashing

Tip: This number should reflect not only damaged flashing, but areas of the roof that are in need of flashing in order to protect the roof from water seepage.

4. Based on the condition of the roof, assign a priority for corrective work:
   o Priority 1: Critical (as soon as possible or within 1 year)
   o Priority 2: Threatening (may become critical in 1 to 2 years)
   • Priority 3: Existing (may become critical in 3 to 5 years)

5. Comments:

FIGURE 12

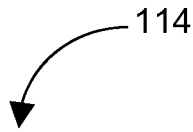

VFA.auditor

Section: 9.0 Interior Doors                                                              Not Started

An interior door is a swinging or sliding barrier in an interior wall or vertical enclosure that allows access between spaces within a building.

Tip: This survey assumes that a single interior door measures approximately 3 feet by 7 feet. A set of double doors counts as 2 doors.

Need more information about this section? See the Glossary.

1. Enter the number of interior doors that require repair (painting, caulking, alignment, hinge replacement, lock repair, etc.) (if none, enter "0"):
   0_____Interior Doors 2. Enter the number of each type of interior door that is damaged or inoperable and requires replacement:
   ☐Not Applicable/ No Cost to Repair
   0_____Aluminum Doors
   0_____Steel Doors
   0_____Wooden Doors
   0_____Galvanized Doors
   0_____Glass Doors 3. Enter the total square footage of all roll-up style doors that require replacement (if none, enter "0"):
   0_____SF Roll-up Style Doors 4. Based on the condition of the interior doors, assign a priority for corrective work:
   o Priority 1: Critical (as soon as possible or within 1 year)
   o Priority 2: Threatening (may become critical in 1 to 2 years)
   • Priority 3: Existing (may become critical in 3 to 5 years)

5. Comments:

FIGURE 13

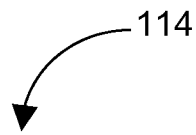

VFA.auditor

Section: 10.0 Stair Finishes                                            Not Started
A stair finish is a product or material applied to the interior stair construction to provide a desired appearance or for public safety.

Need more information about this section? See the Glossary.

1. Enter the linear footage of concrete stair surface with cracks or chips that requires repair (if none, enter "0"):
   0_____LF Concrete 2. Enter the square footage of each type of stair finish that requires replacement or refinishing:
   ☐Not Applicable/ No Cost to Repair
   0_____SF Carpet
   0_____SF Vinyl Sheet Good
   0_____SF Acrylic Coating or Paint
   0_____SF Rubber-molded Treads and Risers
   0_____SF Vinyl-molded Treads and Risers 3. Based on the condition of the stair finishes, assign a priority for corrective work:
   o Priority 1: Critical (as soon as possible or within 1 year)
   o Priority 2: Threatening (may become critical in 1 to 2 years)
   • Priority 3: Existing (may become critical in 3 to 5 years)

4. Comments:

FIGURE 14

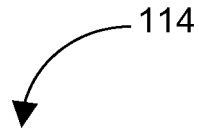

VFA.auditor

Section: 11.0 Interior Wall Finishes                                                 Not Started
An interior wall finish is a product or material that is applied to a surface to protect the wall and provide a desired appearance.

Need more information about this section? See the Glossary.

1. Enter the square footage of each type of interior wall finish that requires replacement or refinishing:

☐ Not Applicable/ No Cost to Repair
    0_____ SF Paint (Oil or Latex)
    0_____ SF Vinyl Wall Covering
    0_____ SF Wood
    0_____ SF Fabric Covering
    0_____ SF Epoxy Coating
    0_____ SF Urethane Clear Coat
    0_____ SF Ceramic Tile 2. Based on the condition of the interior wall finishes, assign a priority for corrective work:
    o Priority 1: Critical (as soon as possible or within 1 year)
    o Priority 2: Threatening (may become critical in 1 to 2 years)
    • Priority 3: Existing (may become critical in 3 to 5 years)

3. Comments:

FIGURE 15

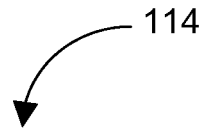

VFA.auditor

Section: 12.0 Interior Floor Finishes                                                   Not Started
An interior floor finish is a product or material applied to a floor surface to provide a desired appearance, for public safety, or to protect the floor.

Need more information about this section? See the Glossary.

1. Enter the square footage of each type of floor finish that requires replacement or refinishing:

☐Not Applicable/ No Cost to Repair
   0_____SF Carpet Tile
   0_____SF Carpet
   0_____SF Vinyl Composition Tile
   0_____SF Sealed or Painted Concrete
   0_____SF Terrazzo
   0_____SF Marble or Stone
   0_____SF Ceramic or Quarry Tile
   0_____SF Sheet Goods
   0_____SF Rubber Flooring
   0_____SF Raised (Computer Room) Flooring 2. Enter the linear feet of rug or carpet with tears or trip hazards (if none enter "0"):
   0_____LF Rug or Carpet 3. Based on the condition of the interior floors, assign a priority for corrective work:
   o Priority 1: Critical (as soon as possible or within 1 year)
   o Priority 2: Threatening (may become critical in 1 to 2 years)
   • Priority 3: Existing (may become critical in 3 to 5 years)

4. Comments:

FIGURE 16

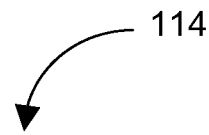

VFA.auditor

Section: 13.0 Ceiling Finishes                                                      Not Started
A ceiling finish is a product or material applied to an interior ceiling surface to achieve a desired appearance, or to provide soundproofing, insulation, and fire protection.

Need more information about this section? <u>See the Glossary.</u>

1. Enter the square footage of each ceiling type that requires repair or replacement:
   ☐ Not Applicable/ No Cost to Repair
   0_____SF Suspended Acoustical
   0_____SF Sheetrock
   0_____SF Plaster
   0_____SF Metal
   0_____SF Concealed Spline Acoustical Tiles
   0_____SF Painted
   0_____SF Decorative Plaster
   0_____SF Wood 2. Based on the condition of the ceiling finishes, assign a priority for corrective work:
   ○ Priority 1: Critical (as soon as possible or within 1 year)
   ○ Priority 2: Threatening (may become critical in 1 to 2 years)
   ● Priority 3: Existing (may become critical in 3 to 5 years)

3. Comments:

VFA.auditor

Section: 14.0 Elevators  Not Started

An elevator consists of a car or platform that moves within a shaft or guides in order to vertically hoist people (passenger) or goods (freight) between the floors of a building.

Need more information about this section? <u>See the Glossary.</u>

1. Enter the number of floors served by each type of elevator:
   ☐ Not Applicable/ No Cost to Repair

|  | Traction | Hydraulic |
   |---|---|---|
   | Passenger | 0 | 0 |
   | Freight | 0 | 0 |

2. Enter the number of elevators that require replacement:

|  | Traction | Hydraulic |
   |---|---|---|
   | Passenger | 0 | 0 |
   | Freight | 0 | 0 |

3. Enter the number of elevators controllers that require replacement:

| Traction | Hydraulic |
   |---|---|
   | 0 | 0 |

4. Enter the number of elevator cab finishes that require replacement:
   Passenger 0
   Freight 0

5. Are passenger and freight elevators inspected annually?
   ○ Yes
   ● No

6. Based on the condition of the elevators, assign a priority for corrective work:
   ○ Priority 1: Critical (as soon as possible or within 1 year)
   ○ Priority 2: Threatening (may become critical in 1 to 2 years)
   ● Priority 3: Existing (may become critical in 3 to 5 years)

7 Comments:

VFA.auditor

Section: 15.0 Plumbing Fixtures                                                                              Not Started
A plumbing fixture is a receptacle in a plumbing system that delvers and drains away water.

Need more information about this section? <u>See the Glossary.</u>

1. Enter the number of damaged or non-functioning plumbing fixtures that require replacement:

☐ Not Applicable/ No Cost to Repair
   0_____Toilets
   0_____Urinals
   0_____Restroom Sinks
   0_____Utility Sinks
   0_____Bathtubs
   0_____Interceptors
   0_____Showers (Built In)
   0_____Showers (Prefabricated)
   0_____Wash Stations (Gang Wash Centers)
   0_____Emergency Eye Washes
   0_____Emergency Eye/Shower Stations 2. Enter the number of each type of drinking fountain that requires replacement:

☐ Not Applicable/ No Cost to Repair
   0_____Porcelain (Non Refrigerated)
   0_____Porcelain (Refrigerated)
   0_____Self Contained (Refrigerated)

3. Based on the condition of the plumbing fixtures, assign a priority for corrective work:
   - ○ Priority 1: Critical (as soon as possible or within 1 year)
   - ○ Priority 2: Threatening (may become critical in 1 to 2 years)
   - ● Priority 3: Existing (may become critical in 3 to 5 years)

4. Comments:

VFA.auditor
Section: 16.0 Domestic Water Distribution                                                    Not    Started
Domestic water distribution is the system for providing water in a building at needed locations via a network or pipes.
Tips:
- To identify the type of domestic water piping, examine the piping that is connected to the water meter.
- Isolation/cutoff valves are usually located near each plumbing fixture in order to shut off the water to that fixture. New installation or replacement of isolation valves may be necessary if the water needs to be shut off at the main valve when there is a leak.

Need more information about this section? See the Glossary.
1. Select the material that makes up the majority of the building's domestic water piping:
    - Not Applicable / No Domestic Water
    o Copper Piping
    o Galvanized Piping
    o Fine thread brass piping
    o Lead-lined Piping
2. Enter the number of active leaks associated with the domestic water system (if none, enter "0"):
    0_____Number of active leaks
3. Enter the number of isolation/cutoff valves that require new installation (if none, enter "0"):
    0_____Isolation valves – Install
4. Enter the number of isolation/cutoff valves that require replacement (if none, enter "0"):
    0_____Number of active leaks
5. Has the domestic water system been tested in the last 5 years for problems such as bacteria, lead, or e-coil?
    - No, the system has not been tested.
    o Yes, the system was tested and the results were unacceptable.
    o Yes, the system was tested and the results were acceptable.
6. Select the type of domestic hot water heater/converter that requires replacement, or that will replace the existing heater/converter:
    - Not Applicable / No Cost to Repair
    o Electric
    o Natural Gas
    o Fuel Oil
    o Steam

Tip: A heater/converter typically requires replacement when it is inoperable, leaking, rusted, or provides insufficient hot water. If the facility has more than one type, select the type that provides the majority of water.
7  Based on the condition of the domestic water distribution, assign a priority for corrective work:
    o Priority 1: Critical (as soon as possible or within 1 year)
    o Priority 2: Threatening (may become critical in 1 to 2 years)
    - Priority 3: Existing (may become critical in 3 to 5 years)
8. Comments:

FIGURE 20

 114

VFA.auditor
Section: 17.0 Sanitary Waste                                          Not Started
Sanitary Waste refers to the network of pipes within a building dedicated to the discharge of bodily and/or household wastes. This waste is discharged into a sanitary sewage (domestic sewage) system.

Need more information about this section? <u>See the Glossary.</u>

1. Select the material that makes up the majority of the building's sanitary piping:
   - ○ Not Applicable / No Sanitary Piping System
   - ○ Hub type (cast iron)
   - ○ No hub (cast iron)
   - ○ Galvanized Pipe
   - • Plastic Pipe 2. Enter the number of active leaks associated with the sanitary system (if none enter "0"):
       0_____Number of active leaks 3. Enter the number of ejector or sump pump sets in the sanitary piping system that are unreliable, inoperable, or old, and that require replacement (if none enter "0"):
       0_____Ejector or sump pump sets 4. Enter the linear footage of sanitary piping that requires replacement:
       0_____LF 5. Does the sanitary system back up?
   - • Yes, the system backs up
   - ○ No, the system does not back up 6. Where does the facility's discharge go?
   - ○ Public Sewer System
   - ○ Septic Tank
   - • Cesspool 7. Based on the condition of the sanitary system, assign a priority for corrective work:
   - ○ Priority 1: Critical (as soon as possible or within 1 year)
   - ○ Priority 2: Threatening (may become critical in 1 to 2 years)
   - • Priority 3: Existing (may become critical in 3 to 5 years)

8. Comments:

VFA.auditor
Section: 18.0 Storm Water System                                      Not Started
The Storm Water System refers to the horizontal and vertical pipes on the interior or exterior of a building that carry rainwater from the roof to the ground or a site drainage system. It includes pipes, roof gutters, roof drains, downspouts, and scuppers.

Note: A building with a flat roof generally has drains connected to drainage piping in the center of the roof.

Need more information about this section? See the Glossary.

1. Select the material that makes up the majority of storm water piping:
    Note: This does not include gutters and downspouts.
    - Not Applicable/ No Storm Water System
    o Hub type (cast iron)
    o No hub (cast iron)
    o Galvanized Pipe
    o Plastic Pipe
2. Enter the number of active leaks associated with the storm system piping (if none enter "0"):
    0_____Number of active leaks
3. Enter the number of ejector or sump pump sets in the storm water system that are unreliable, inoperable, or old, and that require replacement (if none enter "0"):
    0_____Ejector or sump pump sets
4. Enter the number of roof drain strainers that are missing, damaged, or plugged up, and that require replacement (if none enter "0"):
    0_____Roof Drain Strainers
5. Enter the linear footage of storm piping that is leaking, damaged. or visibly corroded. and that requires replacement (if none enter "0"):
    0_____LF Storm Piping
6. Enter the linear footage of each type of gutter and downspout that is missing, leaking, damaged, or visibly corroded, and that requires replacement or new installation:
    ☐Not Applicable/ No Cost to Repair
    0_____LF Aluminum
    0_____LF Copper
    0_____LF Lead-coated copper
    0_____LF Steel
7. Based on the condition of the storm water system, assign a priority for corrective work:
    o Priority 1: Critical (as soon as possible or within 1 year)
    o Priority 2: Threatening (may become critical in 1 to 2 years)
    - Priority 3: Existing (may become critical in 3 to 5 years)

8. Comments:

VFA.auditor
Section: 19.0 Boilers/ Furnaces                                              Not Started
Boilers and furnaces provide heating for a building by generating steam, hot water, or hot air. Boilers and furnaces are powered by electricity, natural gas, fuel oil, or a combination of gas and oil.

Tip: The MBH Output Rating is listed on the boiler/furnace's plate or nametag, usually located neat the serial number. MBH is an abbreviation for a 1000 Btu per hour (Btu/h). Btu (British thermal unit) is a unit of heat that measures the heating power of a system.

Need more information about this section? See the Glossary.

1. If the substructure cannot be assessed, select the checkbox and continue to the next section.
   ☐

2. Enter the total nominal MBH or kW of each type of boiler or furnace (if none, enter "0"):
   0_____MBH Natural Gas
   0_____MBH Fuel Oil
   0_____MBH Natural Gas and Fuel Oil (Dual Fuel Capable)
   0_____kW Electric 3. Do the building's boilers or furnaces adequately heat the space?
   ○ Yes
   • No 4. Are there presently any steam or water leaks associated with boilers or furnaces (check all that apply)?

☐ Steam Leaks

☐ Hot water leaks

☐ Furnaces (including exhaust gas leaks)

5. Based on the condition of the boilers and furnaces, assign a priority for corrective work:
   ○ Priority 1: Critical (as soon as possible or within 1 year)
   ○ Priority 2: Threatening (may become critical in 1 to 2 years)
   • Priority 3: Existing (may become critical in 3 to 5 years)

6. Comments:

FIGURE 23

VFA.auditor
Section: 20.0 Chillers, Condensing Units, and Packaged          Not Started
Cooling Equipment
Chillers, condensing units, and packaged cooling equipment refers to pre-engineered systems containing refrigerant or other media that is used to condition air in a building.
Tip: The size of this type of equipment is expressed in Nominal Tons. The unit of measure is BTU/h (British Thermal Units per hour), where each ton equals the cooling effect of 12,000 BTU/h. One way to find out the tonnage of a unit is from the model number on the nameplate. Tonnage is usually (but not always) the first or second number in the model number. Building maintenance staff or a local service company can help determine the size of the cooling equipment as well.

Need more information about this section? See the Glossary.

1. If there is no chiller, condensing unit, or packaged cooling system, select the checkbox and go to the next section.

☐

2. Select the statement that best describes the building's cooling equipment:
    - ○ Always capable of conditioning the space, even on the warmest of days.
    - ○ Capable of conditioning the space, although on the warmest of days it does not maintain the comfort level.
    - ● Incapable of meeting the conditioning requirements of the building.
    - ○ Has exceeded its useful service life and needs to be replaced.

Tip: Equipment that breaks down frequently, is difficult to repair, or has been in service for more that 21 years (its BOMA lifetime) should be considered for replacement.

3. Enter the number of each size of chiller that requires replacement:

☐ Not Applicable/ No Cost to Repair
    0_____ 100 Tons
    0_____ 200 Tons
    0_____ 400 Tons
    0_____ 600 Tons
    0_____ 1,000 Tons
    0_____ 1,500 Tons 4. Enter the number of each size of condensing unit that requires replacement:

☐ Not Applicable/ No Cost to Repair
    0_____ 2 Tons
    0_____ 4 Tons
    0_____ 6 Tons
    0_____ 8 Tons
    0_____ 10 Tons
    0_____ 12 Tons
    0_____ 15 Tons
    0_____ 20 Tons
    0_____ 25 Tons

FIGURE 24

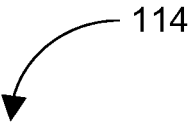

```
0_____30 Tons
0_____40 Tons
0_____50 Tons
```

5. Enter the number of each size of packaged cooling equipment that requires replacement:

☐ Not Applicable/ No Cost to Repair
```
0_____5 Tons or less
0_____5 to 10 Tons
0_____10 to 15 Tons
0_____15 to 20 Tons
0_____20 to 25 Tons
0_____25 to 30 Tons
0_____30 to 40 Tons
```

6. Based on the condition of the chillers, condensing units, and packaged cooling equipment, assign a priority for corrective work:
    o Priority 1: Critical (as soon as possible or within 1 year)
    o Priority 2: Threatening (may become critical in 1 to 2 years)
    • Priority 3: Existing (may become critical in 3 to 5 years)

7. Comments:

VFA.auditor
Section 21.0 Cooling Towers                                                         Not Started
A Cooling Tower is a pre-engineered galvanized, fiberglass, or stainless steel structure that uses outside air to lower the temperature or returned condenser water in a building equipped with a chiller.
Tip: Information regarding the cooling tower's size will likely be found on the building's mechanical drawings. It is seldom on the equipment name plate. The facility personnel at your building may be a good resource for this information as well.

Need more information about this section? <u>See the Glossary.</u>
1. Select the cooling tower material that makes up the majority of the building's cooling towers:
- Not Applicable / No Cooling Towers
- ○ Galvanized
- ○ Fiberglass
- ○ Stainless Steel 2. Enter the number of leaks associated with the cooling towers (if none, enter "0"):
       0_____Number of leaks 3. Have the cooling towers been overhauled (including motors and baffles) in the last 5 years?
- Yes
- ○ No 4. Enter the number of each size of cooling tower that requires overhaul:
       0_____0 - 50 Tons
       0_____51 - 100 Tons
       0_____101 - 300 Tons
       0_____301 - 1000 Tons 5. Select the statement that best describes the building's cooling towers:
- ○ Always capable of conditioning the space, even on the warmest of days.
- ○ Capable of conditioning the space, although on the warmest of days it does not maintain the comfort level.
- Incapable of meeting the building's comfort level and meeting the building's conditioning requirements during the cooling season. Enter how many total tons are required:

0_____Total Tons are required
Tip: If a study exists that identifies the additional tonnage needed, then add that value to the amount of current tonnage to determine the total tonnage value. Otherwise, a median estimate of a 30% increase over the current capacity is reasonable. Facility personnel is a good resource for this information. For example, if the current installed cooling tower capacity is 200 tons, then 60 additional tons are required (30% of 200 tons, or 0.30 x 200), for a total of 260 tons.
- ○ Has exceeded is useful service life and needs to be replaced.

Tip: Equipment that breaks down frequently, is difficult to repair, or has been in service for more than 20 years (its BOMA lifetime) should be considered for replacement.

FIGURE 25

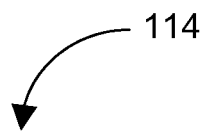

5. Enter the number of each size of cooling tower that requires replacement (if none, enter "0"):
   0_____0 – 5 Tons
   0_____51 - 100 Tons
   0_____101 - 300 Tons
   0_____301 - 1000 Tons 6. Based on the condition of the cooling towers, assign a priority for corrective work:
   o  Priority 1: Critical (as soon as possible or within 1 year)
   o  Priority 2: Threatening (may become critical in 1 to 2 years)
   •  Priority 3: Existing (may become critical in 3 to 5 years)

7. Comments:

VFA.auditor
Section: 22.0 HVAC Piping                                                              Not Started
HVAC Piping is a network of pipes and valves that transport chilled water, heated hot water, steam, and condensate from the building's mechanical infrastructure to various locations.

Need more information about this section? See the Glossary.

1. Select the material that makes up the majority of the HVAC piping:
    - Not Applicable / No HVAC Piping
    o Copper
    o Steel
    o Glavanized 2. Enter the approximate square footage of HVAC piping that requires replacement (if none, enter "0"):
    0_____SF HVAC Piping 3. Enter the number of active leaks associated with the HVAC piping (if none, enter "0"):
    0_____ Number of leaks 4. Enter the number of additional isolation valves in the HVAC infrastructure that are needed (if none, enter "0"):
    0_____ Number of isolation valves – Install
    Tip: Each device in the HVAC system should have an isolation valve.
5. Enter the number of isolation valves that do not operate properly (if all work properly, enter "0"):
    0_____ Number of isolation valves – Repair

Tip: An isolation valve may not be operating properly if it is leaking or stuck in one position, or if the water needs to be shut off at the main valve when leaks in the device occurs. Do not attempt to operate these isolation valves. Please report on what is already known about these valves.

6. Based on the condition of the HVAC piping, assign a priority for corrective work:
    o Priority 1: Critical (as soon as possible or within 1 year)
    o Priority 2: Threatening (may become critical in 1 to 2 years)
    - Priority 3: Existing (may become critical in 3 to 5 years)

7. Comments:

FIGURE 26

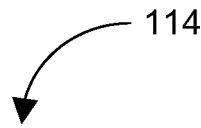

VFA.auditor
Section: 23.0 Circulation Pumps  Not Started
Circulation Pumps are a system of pre-engineered motors and pumps that circulate domestic water (chilled water, condensing water, heated hot water, etc.) through a building's piping distribution system.

Tips:
- Pumps that leak, constantly require maintenance or that do not operate should be considered for replacement.
- The horsepower (HP) of the motor is usually located on the motor's nameplate.

Need more information about this section? See the Glossary.

1. Enter the number of each circulation pump horsepower size that requires replacement:

☐ Not Applicable/ No Cost to Repair
    0_____ Under 2 HP
    0_____ 2 – 5 HP
    0_____ 5 - 10 HP
    0_____ 10 – 20 HP
    0_____ 20 – 30 HP
    0_____ Greater than 30 HP
    0_____ Simplex Condensate Receiver Pumps
    0_____ Duplex Condensate Receiver Pumps 2. Based on the condition of the circulation pumps, assign a priority for corrective work:
    ○ Priority 1: Critical (as soon as possible or within 1 year)
    ○ Priority 2: Threatening (may become critical in 1 to 2 years)
    • Priority 3: Existing (may become critical in 3 to 5 years)

3. Comments:

FIGURE 27

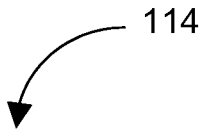

114

VFA.auditor
Section 24.0 Ductwork and Terminal Devices                           Not Started
Ductwork and Terminal (End) Devices provide pre- or post-conditioned air to a building via a system of prefabricated sheet metal, pre-engineered air boxes, cooling and heating fan coil units, heat pumps, radiators, and air conditioning units.

Need more information about this section? <u>See the Glossary.</u>

1. Select the type of device that makes up the majority of the building's distribution system:
    - Not Applicable / No Ductwork and Terminal Devices
    o VAV Boxes
    o CV Boxes
    o Fan Coil Units
    o Heat Pumps
    o Window or Through-The-Wall air Conditioning Units
    o Radiators or Perimeter Fin Tube Radiation (Steam or Heating Hot Water)

2. Select the statement that best describes the building's distribution system:
    - Always capable of conditioning the space, even on the warmest of days.
    o Capable of conditioning the space, although on the warmest of days it does not maintain the comfort level.
    o Incapable of meeting the building's comfort level and meeting the building's conditioning requirements during the cooling season. Enter how many total tons are required:
    o Has exceeded its useful service life and needs to be replaced.
Tip: Equipment that breaks down frequently, is difficult to repair, or has been in service for more than 25 years (its BOMA lifetime) should be considered for replacement.

3. Has the building ductwork been cleaned within the last 15 years?
    - Yes
    o No
    Tip: If the date of the last ductwork cleaning is unknown, examine the exhaust and return duct openings. They should be fairly clean and not caked up with dirt. If they are very dirty, this may indicate the ducts may need to be cleaned.

4. Based on the condition of the ductwork and terminal devices, assign a priority for corrective work:
    o Priority 1: Critical (as soon as possible or within 1 year)
    o Priority 2: Threatening (may become critical in 1 to 2 years)
    - Priority 3: Existing (may become critical in 3 to 5 years)

5. Comments:

VFA.auditor
Section: 25.0 Temperature Control                                    Not Started
Temperature controls are devices that regulate the heating, air conditioning flow, or temperature settings. A thermostat that is connected to a heating or air conditioning system is an example of a temperature control mechanism.

Need more information about this section? See the Glossary.

1. Select the type of device that makes up the majority of the building's temperature controls:
   - ○ Not Applicable / No Temperature Controls
   - • Pneumatic Controls
   - ○ Electric Controls (Low Voltage)
   - ○ Pneumatic / Electric Controls
   - ○ Direct Digital Controls 2. Select the statement that best describes the building's temperature controls:
   - ○ Control instruments are operative and require no repairs.

Tip: System response time to control adjustments is short. The controls never require repair or maintenance work, and control functioning smoothly. The controls appear to be in good condition with all dials clear and legible.
   - ○ Control instructions are operative but require minor or moderate repairs.

Tip: System response time to control adjustments is short. The control's casing is loose, wiring is hanging out, or adjustment pieces do not function properly. Some repair work is required to make is appear to be like new.
   - • Control instruments are not fully operative and require considerable repairs.

Tip: system response time to control adjustments varies between short intervals and long waits. The controls require repeated repair work. The control's casing is loose, wiring is hanging out, or adjustment pieces do not function properly. A considerable amount of repair work is required.
   - ○ Control instruments pose a danger to occupants and should be replaced.

Tip: Shorting occurs, or exposed wiring may cause sparks to occur. Or, the controls do not work at all and occupants do not have a means for adjusting heating and cooling temperatures within their space. Equipment that has been in service more than 20 years may have exceeded its BOMA lifetime and may be considered for replacement.

3. Based on the condition of the temperature controls, assign a priority for corrective work:
   - ○ Priority 1: Critical (as soon as possible or within 1 year)
   - ○ Priority 2: Threatening (may become critical in 1 to 2 years)
   - • Priority 3: Existing (may become critical in 3 to 5 years)

4. Comments:

VFA.auditor
Section: 26.0 Air Handling Units            Not Started
Air Handling Units refers to a system of prefabricated sheet metal, coils, pipes, fans, and fan motors that provides conditioned air to a building.

Tips:
- This section applies to centralized/whole building heating and cooling air handling units, not to decentralized units as described in the *Section 24 – Ductwork and Terminal Devices*.
- Service or maintenance personnel should know the type of air handling units in the building.

Need more information about this section? See the Glossary.

1. Enter the number of leaks associated with the air handling unit coils (if none enter "0"):
        0 _____ Number of leaks 2. Select the type of unit that makes up the majority of the building's air handlers:
   - Variable Air Volume (VAV) Units
   o Constant Volume (CV) System Units 3. Select the statement that best describes the building's air handling units:
   o Not Applicable / No Cost to Repair
   o Always capable or circulating air evenly throughout the building space.
   o Capable of circulating air evenly throughout the building space for the most part, maintaining the comfort level except during periods of extreme weather.
   - Incapable of meeting the conditioning requirements to maintain the comfort level of the building whenever there is a temperature extreme.
   o Has exceeded its useful service life and needs to be replaced.
   Tip: Equipment that breaks down frequently, is difficult to repair, or has been in service for more that 20 years (its BOMA lifetime) should be considered for replacement.

4. Based on the condition of the temperature controls, assign a priority for corrective work:
        o Priority 1: Critical (as soon as possible or within 1 year)
        o Priority 2: Threatening (may become critical in 1 to 2 years)
        - Priority 3: Existing (may become critical in 3 to 5 years)

5. Comments:

FIGURE 30

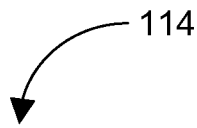

VFA.auditor
Section: 27.0 Ventilation Systems                                                                 Not Started
Ventilation systems refer to devices designed to exhaust or introduce outside air for the purpose of air quality and environmental control.

Tips:
- Ventilation equipment is typically located on the roof or on a sidewall of a building.
- Typical indicators of poor air quality include stagnant air, odors, excessive water vapor, or excessive $CO_2$ levels.

Need more information about this section? See the Glossary.

1. Does the ventilation system equipment operate reliably and provide sufficient air exchanges to maintain air quality?
   - Yes
   ○ No 2. Based on the condition of the ventilation system, assign a priority for corrective work:
   ○ Priority 1: Critical (as soon as possible or within 1 year)
   ○ Priority 2: Threatening (may become critical in 1 to 2 years)
   - Priority 3: Existing (may become critical in 3 to 5 years)

3. Comments:

FIGURE 31

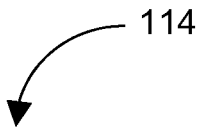

VFA.auditor
Section: 28.0 Sprinklers and Standpipes                                                Not Started
Sprinklers and standpipes refer to a pre-engineered system of piping, valves, heads, and sometimes pumps, which are designed to deliver a predetermined quantity of water to aid in the extinguishing of a fire.

Need more information about this section? <u>See the Glossary.</u>

1 Enter the square footage of the building that is left uncovered by the sprinkler or standpipe system. (if the building lacks a sprinkler or standpipe system and is not required to have sprinklers, or if no part of the building is uncovered, enter "0"):
       0_____ SF left uncovered by sprinklers
2. If the building has three or more stories above ground, enter the number of floors above the second floor that do not have a standpipe (if not applicable or if none, enter "0"):
       0_____ Floors above the second floor lack a standpipe
3. Enter the number of portable fire extinguishers that need inspection:
       0_____ Number of fire extinguishers that need inspection
       Tip: Fire extinguishers are needed even if the property is equipped with automatic sprinklers, standpipe and hose, or other fixed protection equipment. Fire extinguishers should be inspected when initially placed in service and then approximately in 30-day intervals. The inspection tag attached to the extinguisher should have a record of its inspections and maintenance.
4. Enter the number of portable fire extinguishers that have not received maintenance in more than a year:
       0_____ Number of fire extinguishers that need maintenance
       Tip: The inspection tag attached to the extinguisher should have its inspection and maintenance record.
5. Enter the number of portable fire extinguishers that need to be replaced or are missing:
       0_____ Number of fire extinguishers that need to be replaced
6. Enter the square footage of ADP (Automated Data Processing) spaces that need fire suppression (if the building does not have an ADP space, or if none, enter "0"):
       0_____ SF of ADP space that need fire suppression
7. Based on the condition of the ventilation system, assign a priority for corrective work:
       ○ Priority 1: Critical (as soon as possible or within 1 year)
       ○ Priority 2: Threatening (may become critical in 1 to 2 years)
       ● Priority 3: Existing (may become critical in 3 to 5 years)

8. Comments:

FIGURE 32

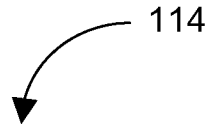

VFA.auditor
Section: 29.0 Electrical Service                                                                      Not Started
Electrical Service refers to the electrical power provided to a building from an electrical service provider (i.e., a utility company) as well as the building's equipment that connects with and controls the power supply that is coming into the building.

Note: Contact the electrical service company for assistance with this section.

Need more information about this section? See the Glossary.

1. Select the statement that best describes the building's electrical service:
    - ○ Not Applicable / No Electrical Service
    - • No particular issues or limitations on the use of the electricity exist because of the lack of capacity from the electrical service provider.
    - ○ Specifically requested to reduce electrical use due to lack of capacity from the electric service provider.
    - ○ Told no additional load can be added to the building because there is insufficient capacity for more electrically powered equipment.
    - ○ Has exceeded its useful service life and needs to be replaced.

Tip: Equipment such as service entrance conduit and cables and the main switchboard should be considered for replacement if it fails frequently, requires significant maintenance, if the circuit breakers "trip" on occasion, or if has been in service for more than 30 years (its BOMA lifetime).

2. Based on the condition of the ventilation system, assign a priority for corrective work:
    - ○ Priority 1: Critical (as soon as possible or within 1 year)
    - ○ Priority 2: Threatening (may become critical in 1 to 2 years)
    - • Priority 3: Existing (may become critical in 3 to 5 years)

3. Comments:

VFA.auditor

Section: 30.0 Electrical Distribution                                    Not Started

Electrical Distribution refers to the system that distributes electrical power throughout a building to needed locations. Equipment can include distribution switchboards, motor control centers, panel boards, feeder wiring, and conduit.

Tip: Electrical equipment should be considered for replacement if it fails frequently, requires significant maintenance, or if has been in service for more than 30 years (its BOMA lifetime).

Need more information about this section? See the Glossary.

1. Select the statement that best describes the building's distribution switchboard:
   ○ Not Applicable/No Electrical System
   ○ Has sufficient space for more circuit breakers and there are no known restrictions of adding more equipment in the building.
   ○ Has little (if any) space for more circuit breakers and there are no known restrictions of adding more equipment in the building.
   ⊙ Has no additional circuit breaker spaces and at times circuit breakers will trip.
   ○ Has exceeded its useful service life and needs to be replaced.

2. Has the switchboard been serviced within the last 3 years?
   ○ Yes
   ⊙ No

3. Select the statement that best describes the building's motor control centers:
   ○ Not Applicable/No Cost to Repair
   ○ Has sufficient space in the motor control panels for more starters/breaker positions and there are no known restrictions of adding more equipment in the building.
   ○ Has little (if any space in the motor control panels for more starters/breaker positions and the building has no restrictions on the current use of electrical equipment.
   ⊙ Has no additional spaces so no additional equipment can be added and potentially circuits breakers/overloads and on occasion the equipment will trip.
   ○ Has exceeded its useful service life and needs to be replaced.

4. Has the motor control center(s) been serviced within the last 3 years?
   ○ Yes
   ⊙ No 5. Select the statement that best describes the building's panel boards:
   ○ Not Applicable/No Cost Repair
   ○ Has sufficient space for circuit breakers and there are no known restrictions of adding more equipment in the building.
   ○ Has little (if any) space for more circuit breakers and there are no known restrictions on the current use of electrical equipment in the building.
   ⊙ Has no additional space and no additional equipment can be added in the building and potentially circuit breakers on occasion the equipment will trip.
   ○ Has exceeded its useful service life and needs to be replaced.

6. Enter the number of panel boards that have not been inspected within the last 3 years (if none, enter "0"):
   0_____Number of panelboards that require inspection

FIGURE 34

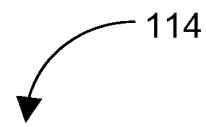

Tip: This involves having a qualified electrician inspect and test the equipment, which may include an Infrared survey of the electrical equipment.

7. Based on the condition of the electrical distribution equipment, assign a priority for corrective work:
   ○ Priority 1: Critical (as soon as possible or within 1 year)
   ○ Priority 2: Threatening (may become critical in 1 to 2 years)
   ⊙ Priority 3: Existing (may become critical in 3 to 5 years)

8. Comments:

FIGURE 34A

VFA.auditor 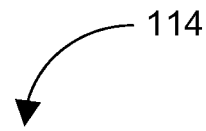

Section: 31.0 Lighting and Power                Not Started

Lighting and branch wiring refers to the system of light fixtures, outlet devices including light fixture outlets, power receptacles (electrical wall outlets), lighting controls (switches), and the wiring for this equipment.

Need more information about this section? See the Glossary.

1. Select the statement that best describes the building's light fixtures:
   ○ Not Applicable/No lighting system
   ⊙ Adequate and contains T8 lamps/No Cost to Repair
   ○ Adequate but contains t12 lamps that should be upgraded to T8 lamps for energy conservation.
   ○ Adequate but light fixture lenses and reflectors are aged.
   ○ Inadequate. Additional lighting is required in the building for (select one):

○ Up to 25% of the building's square footage
   ○ Between 25-50% of the building's square footage
   ○ Between 50-75% of the building's square footage
   ⊙ 75% or more of the building's square footage ○ Completely inadequate and should be replaced entirely.
   ○ Has exceeded its useful service life and needs to be replaced.
   Tip: Lighting equipment should be considered for replacement if it fails frequently, requires significant maintenance due to component failure, or if has been in service for more than 20 years (its BOMA lifetime).

2. Select the statement that best describes the majority of the building's branch circuit and power wiring:
   ⊙ Adequate and functioning properly/No Cost to Repair
   ○ The work areas have aged devices (receptacles and switches) that are broken, painted, and appear to be the original installation.
   ○ The work areas have an inadequate quantity or placement of receptacle outlets that fail to meet the requirements of the occupants for (select one):

○ Up to 25% of the building's square footage
   ○ Between 25-50% of the building's square footage
   ○ Between 50-75% of the building's square footage
   ⊙ 75% or more of the building's square footage
   Tip: Additional electrical service is usually needed if there are many extension cords and the circuit breakers in the panel frequently trip.

○ Has exceeded its useful service life and needs to be replaced.
   Tip: Branch wiring should be considered for replacement if it fails frequently, requires significant maintenance, or if has been in service for more than 40 years (its BOMA lifetime).

7. Is the electrical wiring located above the suspended ceilings secure and intact?
   ○ Yes
   ⊙ No

FIGURE 35

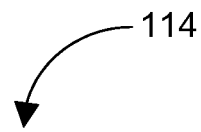

4. Do the workers have to coordinate the operation of various pieces of equipment (coffee pots, microwaves, or copy machines) to prevent circuit breakers from tripping?
   ○Yes
   ⊙No 5. Based on the condition of the lighting and power, assign a priority for corrective work:
   ○Priority 1: Critical (as soon as possible or within 1 year)
   ○Priority 2: Threatening (may become critical in 1 to 2 years)
   ⊙Priority 3: Existing (may become critical in 3 to 5 years)

6. Comments:

VFA.auditor

Section: 32.0 Fire Alarm System                                    Not Started A fire alarm system detects, reports, and acts on occurrences of fires within a building. It consists of a control panel, manual pull stations, horns (strobe), speakers, and wiring.

Need more information about this section? See the Glossary.

1. Select the statement that best describes the building's fire alarm system:
   ○ Not Applicable/No fire alarm system
   ⊙ In fine working order. System failures or miss operations occur infrequently.
   ○ Inadequate and should be replaced. The system is in routine failure or has failed to operate when it should have.
   ○ Has exceeded its useful service life and needs to be replaced entirely.
   ○ The fire alarm system is not in proper working order. System is erratic and cannot be relied upon. Select the percentage that requires repair:

○ Up to 25% of the building's square footage
   ○ Between 25-50% of the building's square footage
   ○ Between 50-75% of the building's square footage
   ⊙ 75% or more of the building's square footage 2. Is the fire alarm system tested annually?
   ○ Yes
   ⊙ No 8. Based on the condition of the fire alarm system, assign a priority for corrective work:
   ○ Priority 1: Critical (as soon as possible or within 1 year)
   ○ Priority 2: Threatening (may become critical in 1 to 2 years)
   ⊙ Priority 3: Existing (may become critical in 3 to 5 years)

4. Comments:

VFA.auditor

Section: 33.0 Emergency Light and Power  Not Started

Emergency lights refer to lighting fixtures that are designed to provide emergency (backup illumination in the event of power failure. The emergency lighting is required to provide signage and automatic illumination to permit safe egress from the building.

Need more information about this section? <u>See the Glossary</u>

1. Enter the number of building exits that are NOT properly marked with an illuminated exit sign (if all exits have signs, enter "0"):
   0                          Number of missing exit signs 2. Enter the number of each type of emergency light fixture that is presently installed in the building:
   ☐Not Applicable/No Cost to Repair
   0                          Light fixtures served via an emergency generator
   0                          Self-contained single-head battery units
   0                          Self-contained dual-head battery units
   0                          Gel packs connected to existing light fixtures 9. Have the emergency lights been inspected or certified within the past 12 months?
   ○Not Applicable
   ○Yes
   ⊙No 10. Enter the number of each type of emergency light fixture that requires replacement or new installation:
    ☐Not applicable/No Cost to Repair
    0                         Light fixtures served via an emergency generator
    0                         Self-contained single-head battery units
    0                         Self-contained dual-head battery units
    0                         Gel packs connected to existing light fixtures 11. Are the building exits kept free of obstructions?
    ○Yes
    ⊙No 12. Could locked exists impede a building evacuation during an emergency?
    ⊙Yes
    ○No 13. Based on the condition of the emergency light and power, assign a priority for corrective work:
    ○Priority 1: Critical (as soon as possible or within 1 year)
    ○Priority 2: Threatening (may become critical in 1 to 2 years)
    ⊙Priority 3: Existing (may become critical in 3 to 5 years)

8. Comments:

FIGURE 37

VFA

*Requirement List Report*
by Asset Name and Category

Region: Steliopolis
Campus: Lowell Campus

Asset Name: Admin Building
Asset Number: 1154

Category: Air and Water Quality

| Requirement Name | Requirement ID | Prime System | Priority | Linked System | Action Date | Finish Date | Cost |
|---|---|---|---|---|---|---|---|
| Decontaminate Domestic Water Distribution System | 2777548 | Domestic Water Distribution | 2-Potentially Critical | Domestic Water Distribution | 03/21/2009 | | 3,512 |
| Ductwork and Terminal(End) Devices Part 3: Dirty Ductwork | 2777569 | Distribution Systems | 3-Necessary-Not Yet Critical | Distribution Systems | 03/21/2012 | | 40,890 |
| Ventilation Systems Part 1: Inoperative Exhaust Fans | 2777574 | Distribution Systems | 1-Currently Critical | Distribution Systems | 03/21/2008 | | 45,930 |

Air and Water Quality Totals: 90,332

Category: Functionality

| Req. Name | Req. ID | Prime System | Priority | Linked System | Action Date | Finish Date | Cost |
|---|---|---|---|---|---|---|---|
| Air Handling Units Part 1: Leaking Air Handling Unit Coils | 2777572 | Distribution Systems | 2-Potentially Critical | Distribution Systems | 03/21/2009 | | 2,570 |
| Air Handling Units Part 2: Aged Variable Air Volume (VAV) Units | 2777573 | Distribution Systems | 2-Potentially Critical | Distribution Systems | 03/21/2009 | | 1,836,037 |
| Boilers/Furnaces: | 2777558 | Heat Generating Systems | 2-Potentially Critical | Heat Generating Systems | 03/21/2009 | | 24,410 |

FIGURE 38

VFA ← 110

Asset List Report
By Real Property ID

Region: Eastern
Campus: Washington Institute

| Real Property ID | Type | Use | Replacement Value | Utilization | FCI |
|---|---|---|---|---|---|
| 9910AAZD7877B266 | Building | 10-Office | 7,704,000 | 84% | 0.77 |
| 9910AAZD7877D278 | Building | 10-Office | 4,819,000 | 67% | 0.70 |
| 9910AAZD7877B290 | Building | 50-Industrial | 6,981,000 | 63% | 0.95 |
| 9910AAZD7877B307 | Building | 74-Laboratories | 6,545,000 | 75% | 0.76 |
| 9910AAZD7877L416 | Land | 10-Office Building Location | 5,478,000 | N/A | 0.80 |
| 9910AAZD7877L616 | Land | 20-Institutional | 3,418,000 | 28% | 0.53 |
| 9910AAZD7877L995 | Structure | 15-Power Distribution | 593,000 | 80% | 0.66 |
| 9910AAZD78778201 | Structure | 76-Road and Bridges | 2,476,000 | N/A | 0.67 |
| 9910AAZD78778523 | Structure | 66-Parking Structure | 2,868,000 | 52% | 0.66 |
| | | Totals: | 40,881,000 | | 0.77 |

FIGURE 39

SYSTEMS AND METHODS FOR GENERATING A FACILITIES REPORT

CROSS-REFERENCE TO RELATED APPLICATIONS

This application claims the benefit of U.S. application Ser. No. 13/835,984 filed Mar. 15, 2013, which is a Continuation-in-part Application of U.S. application Ser. No. 13/741,027 filed Jan. 14, 2013 (now U.S. Pat. No. 8,612,277), which is a Continuation Application of U.S. application Ser. No. 12/690,468 filed Jan. 20, 2010 (now U.S. Pat. No. 8,433,600), which is a Continuation-in-part Application of U.S. application Ser. No. 11/875,518 filed Oct. 19, 2007 (now U.S. Pat. No. 8,428,994), which are incorporated by reference in their entireties.

FIELD OF THE INVENTION

The present invention relates to a system and method for evaluating facilities condition and more specifically, to a customizable system and method for gathering comprehensive information including image capture of a facility or group of facilities to enable a user to make informed decisions relating to the facilities by embedding professional expertise to impart knowledge to a user.

BACKGROUND OF THE INVENTION

Facilities managers face the daunting task of gathering information relating to the current condition of the facility and facilities systems under their management. Often, due to the overwhelming nature of the task and relatively high level of knowledge required of the vast number of facilities systems, facilities managers do not have an accurate picture of the facilities and the condition of the facilities in their care.

One of the goals of a facilities manager is to identify problems in a timely manner, remedy the identified problems at an early stage and project capital budgets so as to extend the life cycle of the facility. To accomplish these tasks, facilities managers have traditionally relied upon various calculations to manipulate Facilities Management Information (FMI) to track costs and generate capital budgets for the maintenance and construction of facilities.

However, the facilities manager typically has had to compile information in an ad hoc manner, for example, filling out paper questionnaires or check sheets related to certain buildings systems and entering the information into, for instance, a spread sheet program. Alternatively, facilities managers have had to hire outside engineers or other professionals to come into the facility to provide a report on a particular facility including the facilities system(s). However, it can be expensive to hire professionals to come into a facility, do an inspection of a particular system and/or systems and then furnish a report on the condition and expected life of the particular system(s). Still further, some facilities managers have created their own system of checking certain facilities systems and have hired personnel with particular expertise with certain systems.

All of these methods, however, are time-consuming and expensive and do not allow the facilities manager to obtain an accurate picture of the current condition of a facilities systems in a cost-effective and timely manner. In addition, the ad hoc information obtained by various facilities managers, while somewhat helpful, often is not complete nor is it provided in an industry standard format. Therefore, if a professional firm is hired to analyze the current systems in the facilities, often they must completely reevaluate the facilities systems.

Additionally, facilities managers for facilities utilized by government agencies and departments are often required to provide a building survey reports designed to meet federal mandates. For example, some mandates require government agencies and departments to collect and report information on all real estate assets owned by the federal government.

SUMMARY OF THE INVENTION

What is desired then is a system and method for providing accurate building information to a facilities manager relating to facilities systems.

It is further desired to provide a system and method allowing a user with limited knowledge of facilities systems to generate a relatively accurate report of the current facilities and/or facilities systems.

It is still further desired to provide a system and method for rapidly generating an accurate report of the current facilities systems as a basis for preparation of capital budgets for the maintenance and construction of facilities.

It is yet further desired to provide a system and method allowing a user with limited knowledge to generate an accurate report of the current condition of facilities and their systems in a format that is an industry standard.

It is still further desired to provide a system and method for allowing a user to quickly and easily generate a facilities report to comply with industry requirements.

It is also desired to provide a system and method that allows a user to generate a facilities report that includes only the particular building/property surveys the user desires.

It is further desired to provide a system and method that allows a user to customize the facilities report to the specifics of the user's specific portfolio requirements.

These and other objects are achieved in one embodiment of the invention by the provision of a system that presents a user with a facilities survey comprising a series of questions/options related to various facilities and/or facilities systems. The user may, in one advantageous embodiment, access the facilities survey through a webpage with a computer via a network connection. A series of questions/options are categorized according to the type of report the user desires to generate, the information associated with the particular report and by individual facility system and are designed to guide the user to look for particularly relevant information to provide an accurate and informative facility report. It should be noted that the use of the term report may include among other things, numerous different types of information and data that may be accessed by a user in virtually any format, whether in a printed format, or on computer or any other medium such that the information may be understood by a user. Additionally, the series of questions/options presented to the user may be altered by the user. For example, rather than the user being presented with a full range of survey questions/options relating to many differing building/property systems, the user may select certain categories or questions/options to answer to generate a report relating to a particular system(s).

As used herein, the following definitions apply to the terms listed. The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "first" and "second" are used to distinguish one element, set, data, object or thing from another, and are not used to designate relative position or arrangement in time.

It should be noted that the term "facility" and "facilities" as used herein are intended to include real estate and any improvements made thereon including, for example but not limited to, building(s), infrastructure associated with the building(s) whether inside or outside of the buildings, roads, pathways, outdoors recreational areas and systems associated therewith.

The terms "Facility Condition Index" or "(FCI)" as used herein is a grading system used to rate the condition of a facility with a rating of 0.0 equating to a facility in perfect condition and ranging to a rating of 1.0 where the cost to repair equals the cost to replace the facility.

The user may, in one advantageous embodiment depending upon the type of report desired, be presented with a series of options relating to, for example, a facility system and/or systems. The series of options may be related to a particular facility system, such as for example, the windows in a building. The user performs a visual inspection of the windows and then answers questions and/or responds to options presented by the system. Additional information relating to windows may already be input into the system. The additional information may include, for example, cost data associated with repair and or replacement of the windows. Alternatively, the additional information may include facilities system data information relating to the existing building system, such as an identification of the type of window, manufacturer, model, quantity in the building and previous and/or current condition, etc. One of the options allows a user to take a picture of the system or device and associate that picture (e.g., a digital picture) with the system and one or more of the options.

In the above example, the user is presented with a series of options/questions by, for example, accessing an Internet webpage, the series of options relating to the windows in a particular building. After inspecting the windows, the user inputs survey information based on the series of options, which are submitted to the system. The system based on the user's answers, associates known facilities system data and cost data with the submitted information/answers to generate a report. The report may provide, for example, a current status of the particular system, a description of the work to be accomplished, and an estimated cost to perform the work.

The report may also include a replacement cost for the window(s), the quantity of windows needed, and the removal and installation costs for the windows affected. It is further contemplated that the associated costs could also account for the geographic location of the facilities as labor costs are known to vary from one geographic location to the next. Still further, the associated costs could be updated in the system on a periodic basis. Additionally, the cost per unit may be dependent upon the total units to be obtained. In this manner, a facilities manager is able to provide a relatively complete and accurate report despite having limited knowledge of the facility or the systems associated with the facility as the system associates a wide array of expertise to the various system questions answered by the user. This is because specialized knowledge for each system is associated with the questions related to each system such that the user is provided with a report that draws on the expert knowledge of many systems experts. It is further contemplated that life cycle data may be provided to the user, including for example, in the generated report. The life cycle data may include information including, but not limited to, identifying when the system(s) was installed, identifying any and/or all maintenance performed on the system(s) that may or may not affect the life cycle of the system, and information relating to an estimated end-of-life for the system. All of this life cycle data may, in one advantageous embodiment, be provided to the user in a format selected by the user and/or provided in the facilities report.

While the system may be used with many differing types of facilities having one or more locations and one or more buildings on each location, in a preferred embodiment the system used for facilities having buildings with at least a minimum of 1,000,000 aggregated square feet. For example, this could include a single building comprising 1,000,000 square feet or multiple buildings that when aggregated comprise 1,000,000 square feet. It has been determined that the larger the facility and subsequently that larger and/or more numerous the associated system(s), the ability of the system to generate an even more accurate cost estimate increases.

It is further contemplated that the facilities report that is generated can provide an analysis of the facilities or building systems so as to provide for a targeted assessment of various systems. For example, the report can identify which systems are in need of immediate attention identifying a suggested priority in which the variously identified systems could be addressed. The assessment could include, for example, a time frame within which work should to be performed on the particular facilities system and/or a cost associated with the work to be performed on the particular facilities system and/or within the particular time frame.

The facilities report generated by the system could further include an asset report. The asset report could comprise various information related to the facilities including, for example, an identification of the property, a description of the type of property, a description of how the property is being used, a replacement value for the property, an assessment of the property utilization, and the FCI of the property. This report could also include a funding/FCI graph that illustrates funding of a particular facility over time versus FCI, which graph may further be customizable to allow for a variable number of years in the projection.

Still further, the facilities report could include a compliance report as is required, for example, by Government mandates. The compliance report can provide all the information required by the federal mandate including, for example but not limited to, the facilities location, the facilities description, the utilization of the facilities, the condition of the facilities systems, and compliance and/or non-compliance with applicable building codes.

It is further understood that the facilities report can include any amount of information or be targeted to certain facilities systems as desired by the user. For example, the system can allow the user to add or remove certain systems from a survey to include or exclude them from the facilities report. The system further allows the user to alter or rename systems as desired. Finally, the system also allows for copying of existing system information to account for varying conditions and priorities. This provides the specific benefit that end-users will have more control over field data collection and the adding of building systems on the fly will increase survey accuracy to provide enhanced planning and reporting.

The survey of the various systems and facilities may be accomplished by use of a tablet-type device (e.g., a handheld mobile computing device, such as, for example, an iPad R or similar device) that allows the user to access a web page to input the survey data. In an embodiment, the user accesses the web page application, logs in and either selects the project associated with the facility or opens a new project and enters information in relating to the project (facility address, number of buildings, square footage of the building (s), etc.). The user may be presented with a series of options relating to various facilities systems (such as, electrical, mechanical, life protection, HVAC, etc.), which the user can enter information relating to the particular system. Additionally, the user may find it advantageous to take a digital picture of the system (e.g., the user decides to take a picture of the service entrance name plate listing the model, voltage, phase, amperage, etc. of the panel). In order to take the picture, in one embodiment the user is presented with a Graphic User Interface that may take the form of a button on the screen of the mobile device allowing the user to take a picture and upload the picture to the server associated with the web page. Alternatively, the user may have a separate digital camera and, upon taking a picture(s), can upload the picture to the server associated with the web page. In this manner, when viewing the survey information relating to the particular facility system, not only can a user see the information about the system, but the user can also see a digital photograph (or video clip) showing the actual system. This can be very helpful in determining whether or not a particular system needs urgent maintenance or repair. For example, a high pressure pipe may not appear to need urgent repair to an individual with little training, but a digital picture could be analyzed remotely by a person with significant expertise who could make the determination as to whether urgent action is required. Additionally, numerous digital pictures (or video clips) could be taken and saved on the device or camera during the survey and then later uploaded and associated with the particular systems at a later time. Still further, previous digital pictures can be pulled up on the mobile device so that the user performing the survey can compare the previous condition to the current condition, both of which can be time-stamped for documentation purposes. In another embodiment, the digital photo GUI can automatically route a digital photo(s) to one or more locations (e.g. automatically send to the web page server such that the photo(s) is associated with the particular system; and/or save the photo(s) on the mobile device).

It is still further understood that the user device (mobile device) may include Global Positioning System (GPS) functionality such that the device will automatically identify a location of the device that may be associated with a facility address/location. In this manner, when a user arrives at a facility, the device may automatically query the user to determine if a file relating to a facility corresponding to the identified location should be accessed. Likewise, survey data (including photos/videos/video clips/etc.) can be automatically associated with a particular facility based on an identified location of the device. All of this allows for case of use and greater efficiency for the user.

In one advantageous embodiment a method for generating a facilities report is provided comprising the steps of generating a series of options relating to various facilities, storing the series of options on a storage accessible by a system computer and generating and storing facility data selected from the group consisting of compliance data, facilities system data and combinations thereof, that relate to various facilities. The method further comprises the steps of associating the facility data with the series of options, presenting the series of options to a user accessing a user computer coupled to the system computer via a network connection and receiving survey data from the user, the survey data based on the user's responses to the series of options. Still further, the method further comprises the steps of gathering facility data based on the survey data received from the user, generating a facilities report based on the survey data and the gathered facility data and presenting the facilities report to the user.

In another advantageous embodiment a system for generating a facilities system report is provided comprising a system computer accessible by a user computer via a network connection and a facilities data storage accessible by said system computer. The facilities data storage has stored thereon a series of options relating to various facilities and facilities data selected from the group consisting of compliance data, facilities system data and combinations thereof, which relate to various facilities, where particular facilities data is associated with particular options of the series of options. The system is provided such that the series of options is presented to the user. The system further comprises survey data received by the system computer, the survey data being based on the user's responses to the series of options. The system still further comprises a facilities report generated by the system computer and is based on the received survey data and gathered facilities data associated with the survey data.

In still another advantageous embodiment a method for generating a facilities report is provided comprising the steps of generating a series of options relating to various facilities systems and storing the series of options on a storage accessible by a system computer. The method further comprises the steps of generating and storing cost data associated with particular facilities systems where the cost data includes labor costs and/or materials costs.

The method still further comprises the steps of associating the cost data with the series of options, presenting the series of options to a user accessing a user computer coupled to the system computer via a network connection and receiving survey data from the user, the survey data based on the user's responses to the series of options. Finally, the method comprises the steps of gathering cost data based on the survey data received from the user and generating a facilities report based on the survey data and the gathered cost data.

In another advantageous embodiment a method for generating a facilities report where facilities data is associated with a series of options relating to various facilities and stored on a storage coupled to a system computer is provided, the method comprising the steps of presenting the series of options to a user accessing a user computer coupled to the system computer via a network connection and receiving survey data from the user, the survey data based on the user's responses to the series of options. The method further comprises the steps of selecting facility data based on the survey data received from the user and generating a facilities report based on the survey data and the selected facility data.

In yet another advantageous embodiment a system for generating a facilities report is provided comprising a system computer, a user computer coupled to the system computer via a network connection and a facilities data storage accessible by the system computer. The system is provided such that the facilities data storage has stored thereon facilities data associated with a series of options relating to various facilities systems. The system is further provided such that the series of options presented to the user. The system further comprises survey data received by the system computer and stored on the facilities data storage, the survey data corresponding to the user's responses to the series of options and a facilities report generated by the system computer, the facilities report generated based on the received survey data and on certain facilities data corresponding to the received survey data.

Other objects of the invention and its particular features and advantages will become more apparent from consideration of the following drawings and accompanying detailed description.

BRIEF DESCRIPTION OF THE DRAWINGS

FIGS. 4 and 5 are screen shots of the embodiment according to FIG. 3;

FIGS. 6-37 are screen shots of the embodiment according to FIG. 2;

FIGS. 38-40 are screen shots of various reports generated by the system according to FIG. 2:

DETAILED DESCRIPTION OF THE INVENTION

Figure 1:
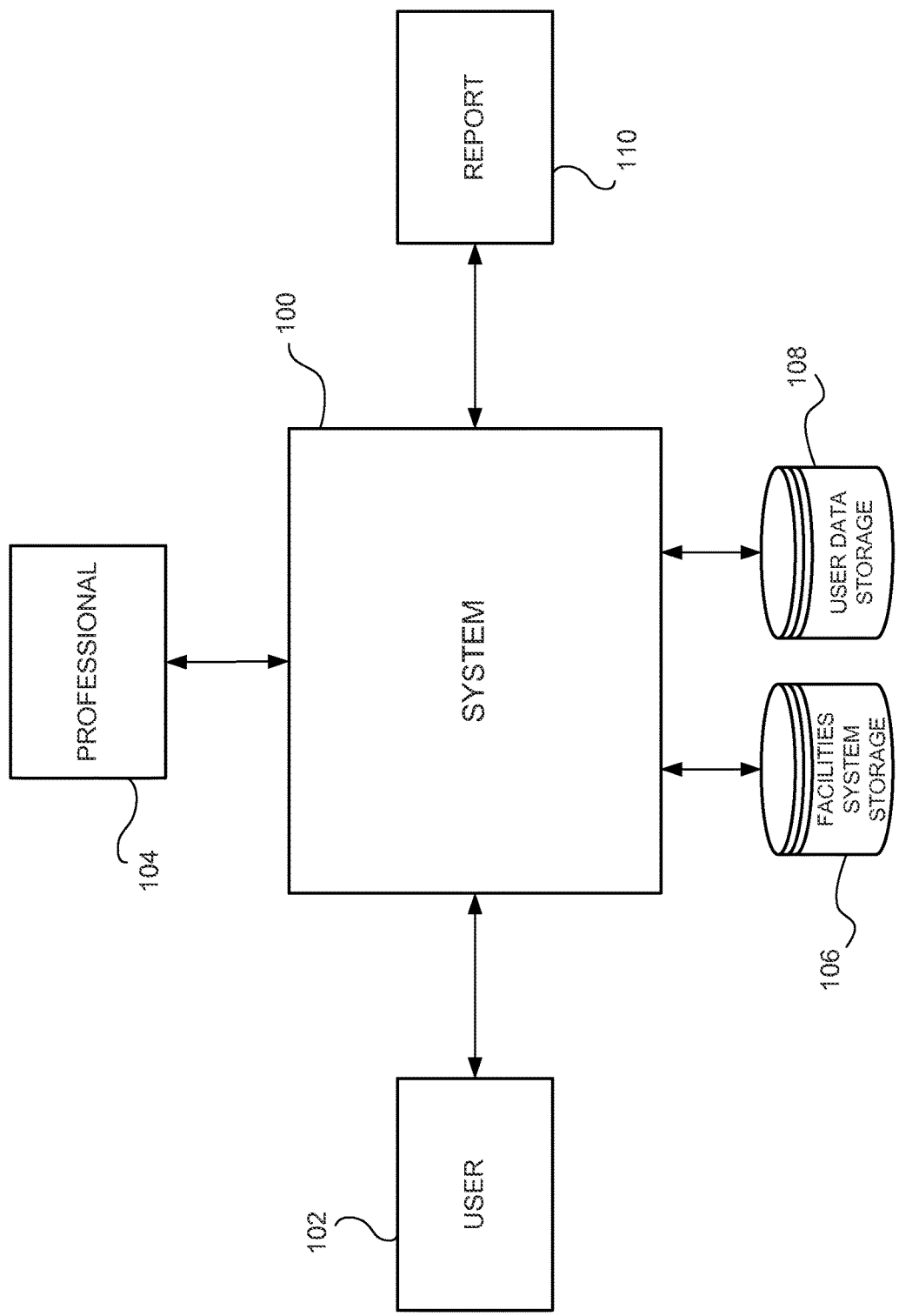
FIG. 1 is a block diagram of one embodiment of the present invention.
Figure 2:
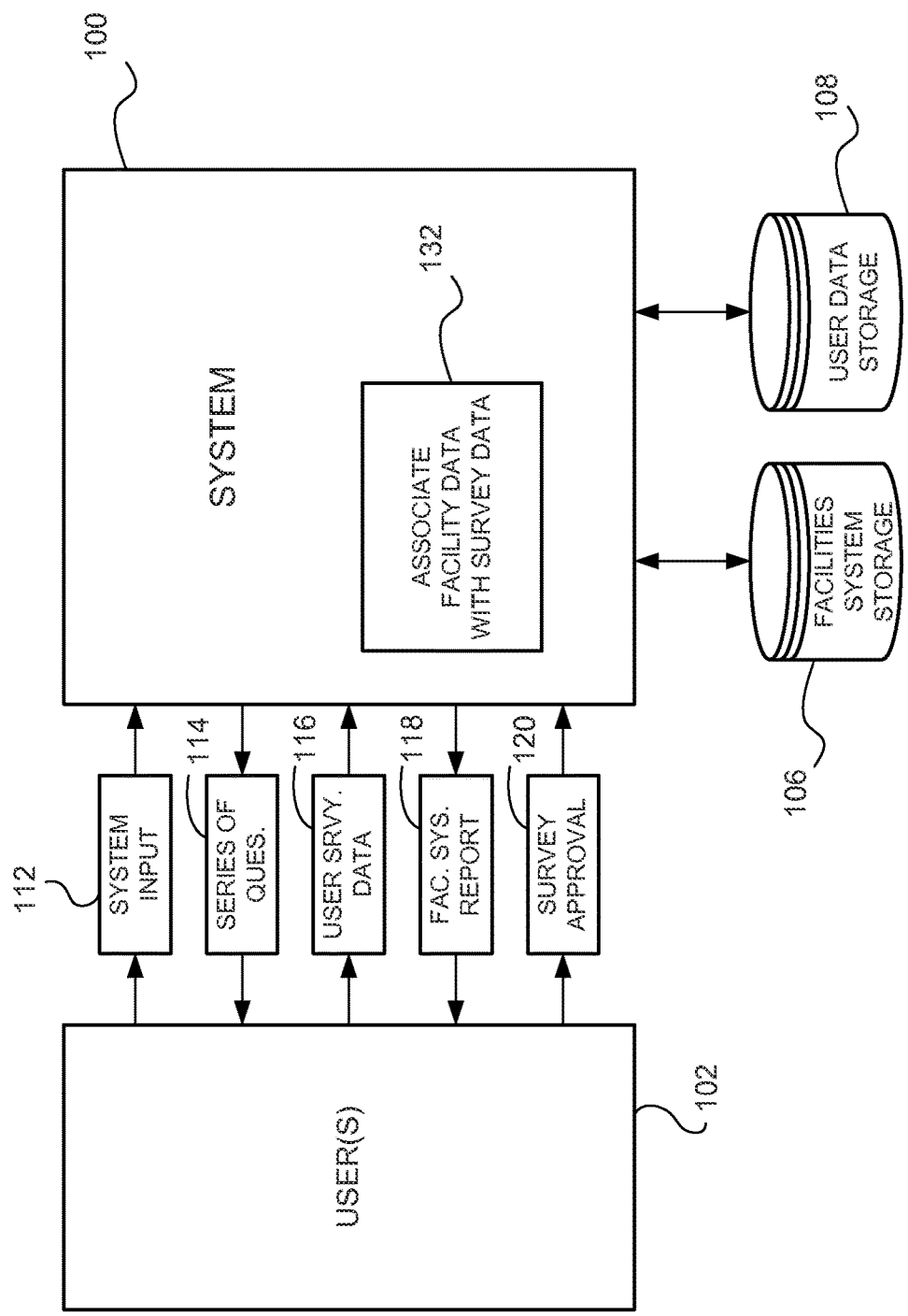
FIG. 2 is a block diagram of the embodiment according to FIG. 1.
Figure 3:
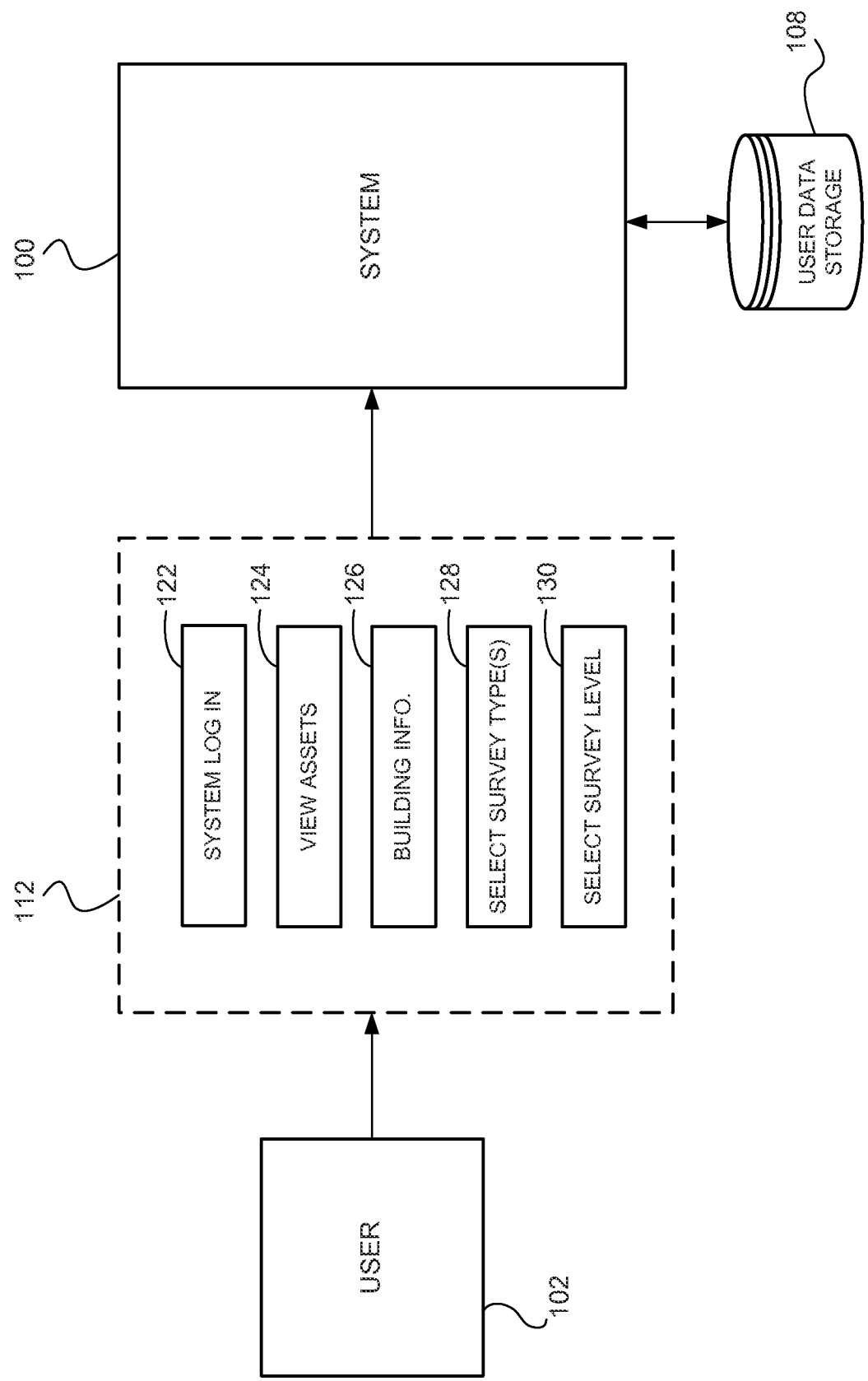
FIG. 3 is a block diagram of the embodiment according to FIG. 2.
Figure 4:
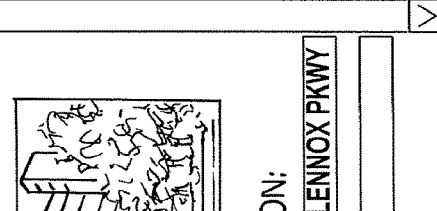

Referring now to the drawings, wherein like reference numerals designate corresponding structure throughout the views.

FIG. 1 is a block diagram of an advantageous embodiment of the present invention depicting a system 100 for generating a report 110. A user 102 accesses the system 100 with a computer (not shown). In one embodiment, the system 100 is accessed via a network connection such as, for example, the Internet. The user 102 may be presented with a webpage allowing access to system 100.

Figure 41:
FIGS. 41 and 42 are screen shots depicting running action cost, running survey cost and running survey FCI.
Figure 42:
Figure 43:
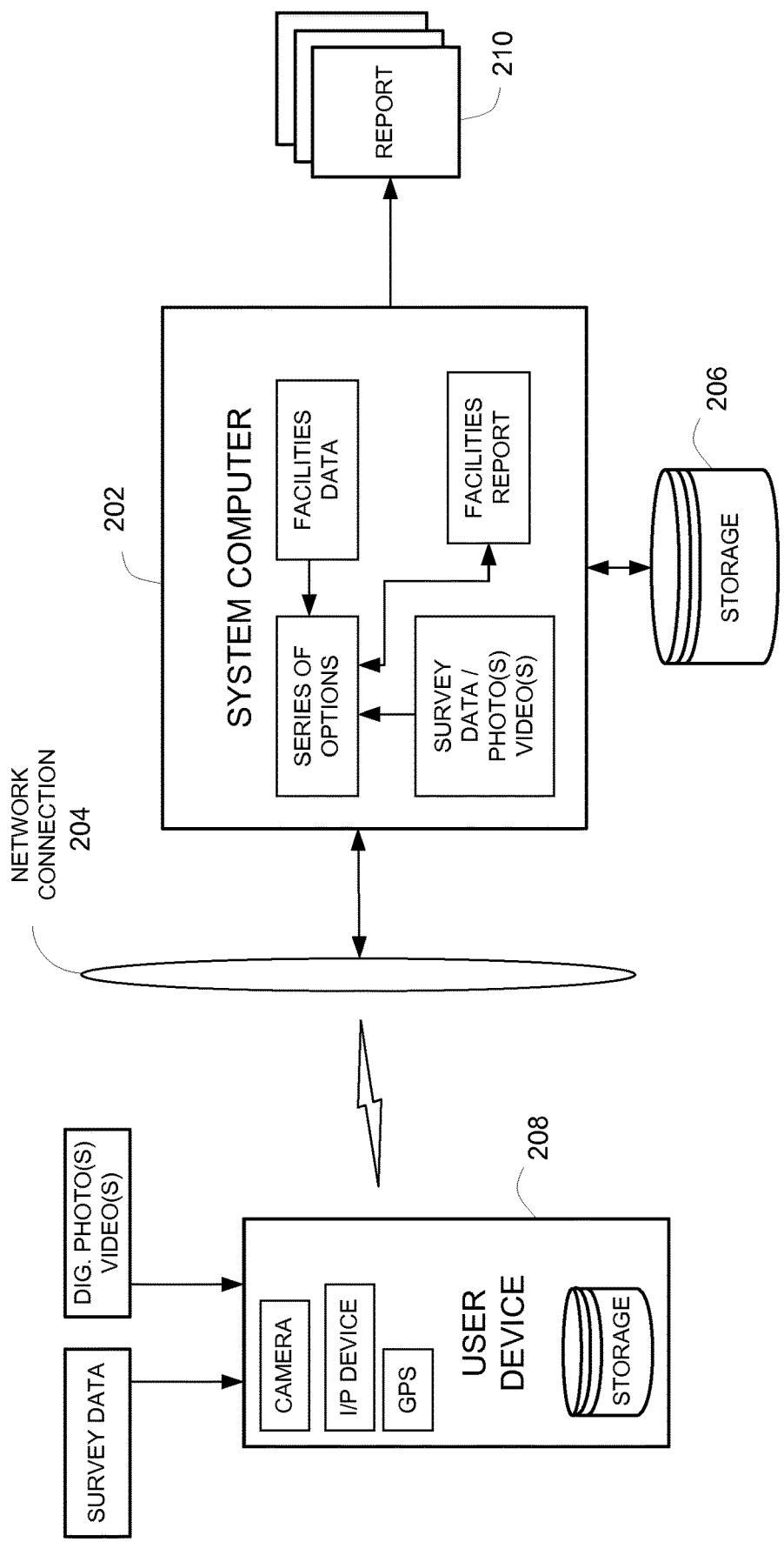
FIG. 43 is a block diagram of an advantageous embodiment of the present invention according to FIG. 1.

FIGS. 41 and 42 are screen shots depicting running action cost, running survey cost and running survey FCI:

FIG. 43 is a block diagram of an advantageous embodiment of the present invention according to FIG. 1: invention depicting a system 100 for generating a report 110. A user 102 accesses the system 100 with a computer (not shown). In one embodiment, the system 100 is accessed via a network connection such as, for example, the Internet. The user 102 may be presented with a webpage allowing access to system 100.

Referring now to FIGS. 1 through 4, the user 102 may be, for example, a facilities manager that accesses the system to generate a report 110 relating to the facilities. Initially the user 102 will log-in 122 to system 100 to generate and/or input user information into a user account. Once completed, the user 102 may then input building information 126 relating to the facilities. This information may include, for example but is not limited to, the name of the facility, the address, the type of facility, the quantity or number of buildings, the number of floors in the building, the area of the building, the owner of the facility, a description of use, historical information, the year of construction and/or renovation, the architect and/or construction company, the replacement value and the FCI (FIG. 4), to name just a few of the many categories of information that may initially be input into system 100.

This initial information may be stored in, for example, user data storage 108 accessible by system 100.

Once this initial building information 126 is input into system 100, user 102 has the opportunity to view the assets 124 listed on the system. However, to provide a meaningful report on the facilities, the user will need to gather and input additional information into system 100 relating to the various buildings and facilities systems.

To that end, the user 102 may begin a comprehensive survey of the facilities. It is contemplated that the user may select a survey type 128, such as for example, inputting information relating to a particular system(s) or even select a survey level 130 including more or less information in the initial survey and corresponding report to be generated. Alternatively, the user 102 could proceed with a standard comprehensive survey provided by system 100 to initially gather a relatively large amount of information on the facilities. To generate a report 110 directed toward, for example, the current condition of the facilities systems, the user 102 is presented with a series of questions 114 directed toward various systems in the facility. Examples of the questions that may be presented to user 102 are depicted in screen shots shown in FIGS. 5 through 37.

For example, the user 102 may initially be presented with Section 1.0 Building Information 126, which lists general information relating to a particular facility or building (FIG. 5). The user 102 has the opportunity to review and revise the listed information relating to the facility and/or building from this page.

The user 102 may further be presented with Section 2.0 Substructure—Footing and Foundations 114 as shown in FIG. 6. The user 102 is required to answer the series of questions provided including, for example, inputting the square footage of concrete footing and foundation with visible cracks or chips that require repair along with a priority rating of the need to address the system within a particular time frame. A Comments Section is also provided allowing the user 102 to provide comments as necessary in the evaluation and for future use.

It is contemplated that a comprehensive series of questions relating to various facilities and/or building systems may be presented to the user 102. The Figures list just some of the many various categories of systems that may be queried and include, but are not limited to the following:

Section: 3.0 Basement Walls (FIG. 8)
Section: 4.0 Floor and Roof Deck Construction (FIG. 8)
Section: 5.0 Exterior Walls (FIG. 9)
Section: 6.0 Exterior Windows (FIG. 10)
Section: 7.0 Exterior Doors (FIG. 11)
Section: 8.0 Roofing (FIG. 12)
Section: 9.0 Interior Doors (FIG. 13)
Section: 10.0 Stair Finishes (FIG. 14)
Section: 11.0 Interior Wall Finishes (FIG. 15)
Section: 12.0 Interior Floor Finishes (FIG. 16)
Section: 13.0 Ceiling Finishes (FIG. 17)
Section: 14.0 Elevators (FIG. 18)
Section: 15.0 Plumbing Fixtures (FIG. 19)
Section: 16.0 Domestic Water Distribution (FIG. 20)
Section: 17.0 Sanitary Waste (FIG. 21)
Section: 18.0 Storm Water System (FIG. 22)
Section: 19.0 Boilers/Furnaces (FIG. 23)
Section: 20.0 Chiller, Condensing Units (FIGS. 24 & 24A)
Section: 21.0 Cooling Towers (FIGS. 25 & 25A)
Section: 22.0 HVAC Piping (FIG. 26)
Section: 23.0 Circulation Pumps (FIG. 27)
Section: 24.0 Ductwork and Terminal Devices (FIG. 28)
Section: 25.0 Temperature Control (FIG. 29)
Section: 26.0 Air Handling Units (FIG. 30)
Section: 27.0 Ventilation Systems (FIG. 31)
Section: 28.0 Sprinklers and Standpipes (FIG. 32)
Section: 29.0 Electrical Service (FIG. 33)
Section: 30.0 Electrical Distribution (FIGS. 34 & 34A)
Section: 31.0 Lighting and Power (FIGS. 35 & 35A)
Section: 32.0 Fire Alarm System (FIG. 36)
Section: 33.0 Emergency Light and Power (FIG. 37)

It is contemplated that the series of questions relating to various facilities and/or building systems as listed above may be stored in facilities system storage 106 and assessable by system 100 for presentation to user 102. User 102 then answers some or all of the series of questions generating the survey data that may be stored, for example, on user data storage 108.

It should be noted that, while various functions, methods and/or questions have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Additionally, it is contemplated that facility data is also generated and stored, for example, on facilities system storage 106. The facility data may comprise, for example, cost data associated with repair and or replacement of a particular system. The associated costs could also account for the geographic location of the facilities as labor costs are known to vary from one geographic location to the next. Still further, the associated costs could be updated in the system on a periodic basis. The associated costs could take into consideration the time frame within which the work is to be accomplished and also the time of year.

In this manner, the system 100 is able to take into account the following: 1) initial information submitted by the user 102 relating to, for example, an identification of the type of system, manufacturer, model, quantity in the building and previous condition: 2) survey data submitted by the user 102 comprising responses to the questions and comments submitted; and 3) facilities data associated with the series of questions providing for the cost associated with repair and or replacement of a particular system. In this manner, the user 102 is able to generate a relatively complete and accurate report 110 despite having limited knowledge of the facility or the systems associated with the facility.

The system 100 may be used with many differing types of facilities having one or more locations and one or more buildings on each location, in a preferred embodiment the system used for facilities having buildings with at least a minimum of 1,000,000 aggregated square feet. For example, this could include a single building comprising 1,000,000 square feet or multiple buildings that when aggregated comprise 1,000,000 square feet. For example, it has been determined that the larger the facility and subsequently that larger and/or more numerous the associated system(s), the ability of the system 100 to generate a more accurate cost estimate increases.

It iS still further contemplated that that the report 110 can be fully customized and presented to the user 102 in a desired format.

While Sections 3.0-33.0 are provided above as examples of various system categories that may be presented to the user, it should be understood that additional categories may be used. Additionally, the system is customizable such that, the user may select only certain categories of questions to be presented to the user allowing the user to target only certain systems or subsystems. Still further, it is contemplated that once initial building information is entered into the system, the user may decide to generate a report at a later date, for example, a year later. In this example, the user may select only certain categories of for providing information (or updated information). This allows for a targeted approach to the generation of the facilities report requiring less time of the user to generate it, while still providing a highly accurate facilities report.

The system, may in one advantageous embodiment, automatically import or populate the existing facilities data to into a report that provides current information to the user (e.g., adjusted FCI, etc.) based on the current date. In this manner, the user can either, enter new information relating to facility or provided updated information for over-writing the existing facility data. In either case, the user is provided with increased customizability for the facilities report. Also, the user is able to use existing information that was previously entered into the system to generate a current report on the facility.

Referring to FIG. 38, an example of a Requirement List Report is provided as report 110. The report describes the work to be done as Requirement Name, a Requirement ID is provided, an identification of the system involved is provided described as Prime System, a priority is assigned to the project, systems linked to the prime system are identified, an action date is provided along with a finish date, and an estimated cost is provided. The Requirement List report can take into consideration some or all of the information listed above including the initial information, the survey data and facilities data associated with the series of questions and survey data. In this manner, the user 102 is provided with an accurate and comprehensive report 110 despite having limited knowledge of the existing systems or the facility.

In this manner, the system 100 that generates the report 110 provides for the ability to set up workflows and assign approval rights. For example, a user 102 may input the survey data to generate the report 110 as illustrated in FIG.

38. Another individual may have access to the report 110 for review and/or editing or modification. Various approval rights can be set up to allow for approval to the work identified in the report and for the management of the workflow. The system 100 is fully customizable to accommodate all of these options for the user(s).

Referring to FIG. 39, an example of an Asset List Report is provided as report 110. The Asset List Report includes, for example, a Real Property ID, an asset type, an asset use, a Replacement Value, an asset Utilization and an FCI. This report 110, allows for streamlining of the budgeting process and optimization of lifecycle planning.

Figure 40:
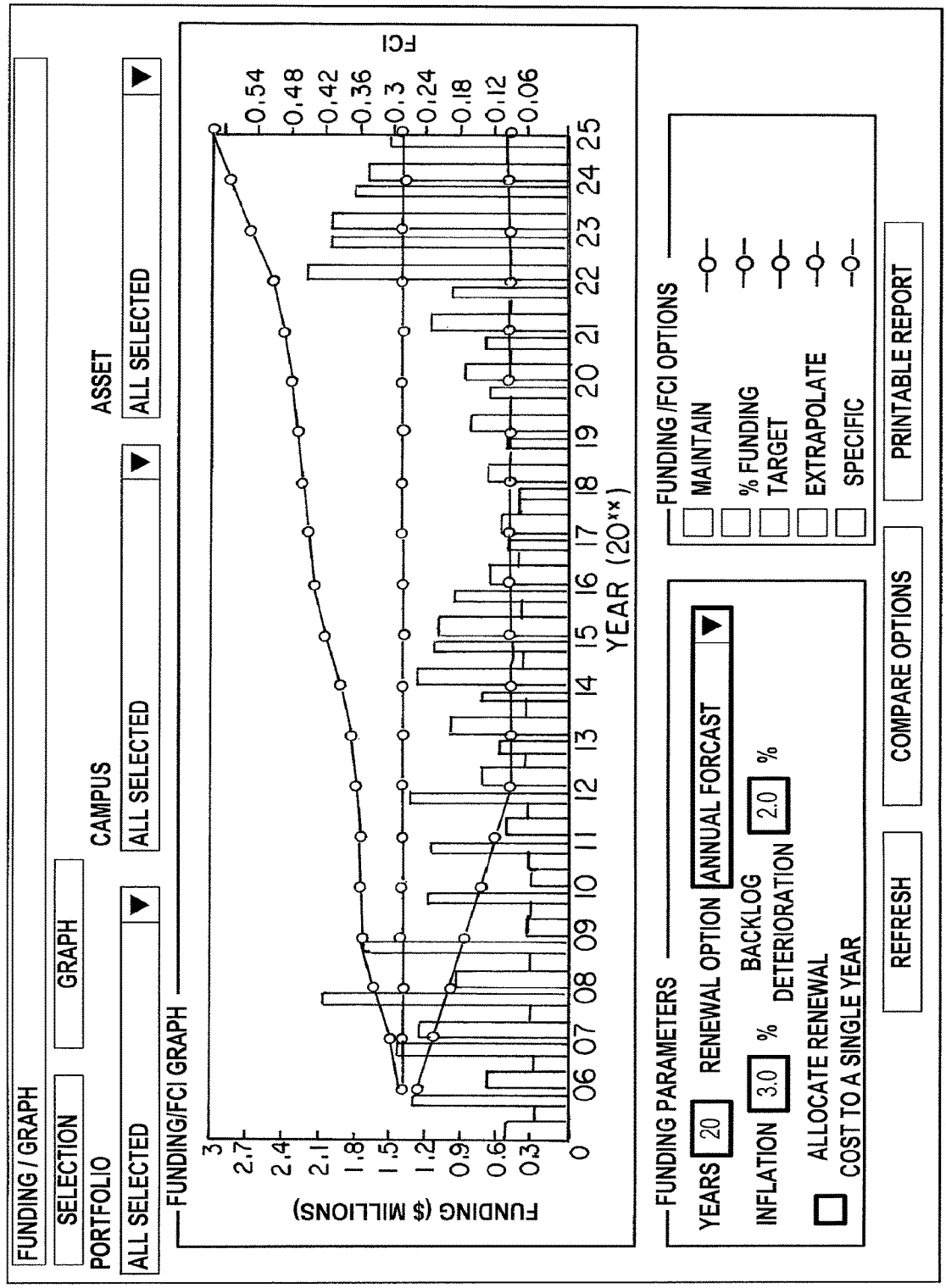

Referring to FIG. 40, an example of a Funding/FCI Graph is provided as report 110. The graph illustrates funding over time versus the FCI illustrating how the selected funding can affect the FCI. Again, this report ensures accuracy with industry standards, allows for projecting the impact of different levels of spending and allows for the use of industry standard benchmarks.

In addition to the above-mentioned reports, it is contemplated that the user 102 could provide a survey designed to meet a federal mandate. Still further, the report 110 could provide information to user 102 relating to an existing condition in a facility, such as for example, but not limited to, identification of hazardous materials that may reside in the facility. Alternatively, the report 110 may provide information relating to Americans with Disabilities Act (ADA) compliance, life and safety issues and/or energy efficiency. The system 100 is very versatile allowing for fully customization to meet the user's 102 needs.

Referring back now to FIG. 1, it is still further contemplated that a professional 104 may access system 100 to review the survey data submitted by user 102 and in particular, review any comments submitted by user 102. This provides the ability to provide a report 110 that is still further refined providing highly accurate information for capital and budget planning.

It should be noted that some of the Figures (e.g. 6-37) provide for a "glossary." of information to assist the user in ascertaining the type of system in the facility. For example, the user may be provided with a question relating to the windows in the facility as described in connection with FIG. 10 under the section Exterior Windows. To further aide the user in providing accurate information relating to the facility, the user could access the "See the Glossary" link provided on the page where a number of differing types of windows are described and photographs may be presented. The user is then further aided in selected the correct type of window currently used in the facility to ensure increased accuracy of the report.

FIGS. 41 and 42 depict real-time Cost and FCI Calculations. For example, as a user is presented with series of questions and provides input information relating to action to be taken, the system provides a running Action Cost 200 that indicates to the user the cost associated with the action selected by the user. This provides the user with immediate, real time information relating to the decisions made by the user. Also provided is Survey Cost 202, which provides the user with a running total of the action costs. This again, provides the user with immediate, real time information as the user makes decisions.

If, for example, the user decides, based on a presented Action Cost 200 for a particular action selected, that he/she does not want to proceed with the selected action, the user can then reverse the selection. In this case, the Survey Cost 202 will be adjusted accordingly.

Also shown in FIGS. 41 and 42 is Survey FCI 206, which indicates to the user how the selected action will impact the FCI of the particular facility associated with the action. As stated previously, this is another tool that allows for immediate, real time information to be presented to the user so the user can see how each decision impacts, not only the cost of the project(s), but also the FCI of the facility.

Figure 44:
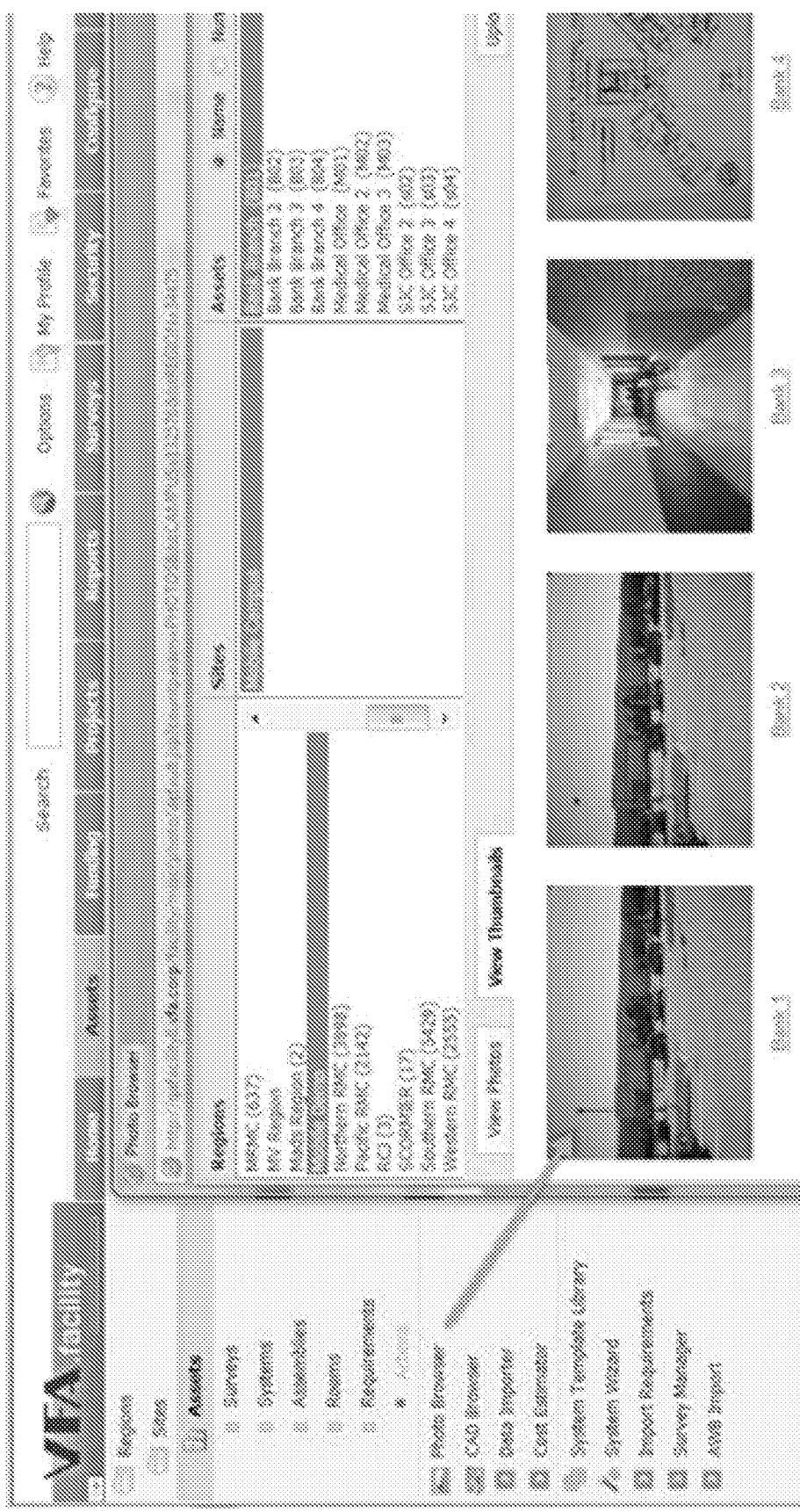
FIG. 44 is a screen shot depicting the web page interface showing the photo browser feature of the survey system.
Figure 45:
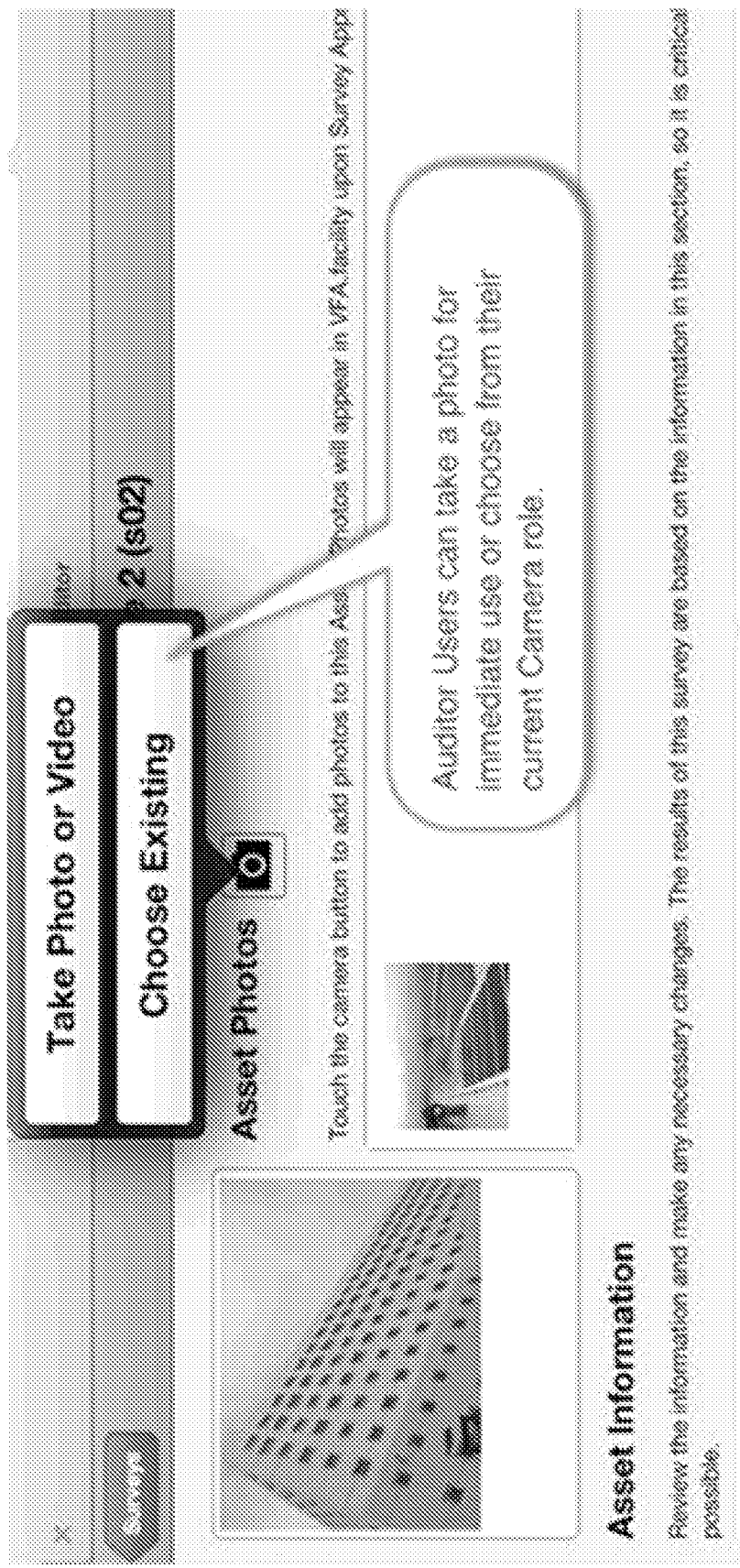
FIG. 45 is a screen shot depicting the graphic user interface to manage asset photos.

Referring now to FIGS. 43-45, FIG. 43 is a block diagram depicting a system computer 202 connected to a network connection 204. System computer 202 is connected to a storage 206, which may store a series of options associated with various types of facility systems. Also stored on storage 206 is facility data associated with the various series of options. It is contemplated that a user device 208 may access the system computer via a web page over the network connection. The user device may comprise any type of mobile computing device, but in one embodiment comprises a tablet-type computing device.

A user, accesses the series of options on the user device 208 by via a web page interface. In this manner, the user may physically walk In one embodiment, the user may take digital photographs (or videos) of particular facilities, systems and/or deficiencies. This digital information may be stored on the mobile device and uploaded to the system computer 102 to be associated with a particular facilities, systems and/or deficiencies in the facility. It should be understood that digital photographs/videos when captured, may be automatically routed to storage 206 and associated with a particular facilities, systems and/or deficiencies.

The system computer 202 receives the survey data and any digital photos and/or videos, and based on this information along with facilities data associated with the series of options, generates a facility report. The facilities report is discussed in connection with FIGS. 41-42 and will not be re-described here.

In one advantageous embodiment, digital photographs and/or video (video clips) may be taken of a facility and/or facility systems and automatically associated with a particular facility based on a location identification. For example, a mobile device may be provided with GPS functionality such that when a digital picture and/or video (video clip) associated with a facility is captured, the system can automatically identify the facility based on a location identification due to the GPS function of the mobile device. In particular, this could occur automatically such that the user need only confirm that the data gathered is associated with a particular identified facility. In one embodiment, the mobile device could automatically identify the mobile device location and present an option to the user to confirm that a file for a particular facility should be accessed and/or opened. Likewise, data gathered at the location can be automatically associated with the facility based on location identification.

FIG. 44 illustrates a screen shot of the web page interface that depicts the "photo browser" option allow a user to manage photos and videos.

The web page includes a view of thumbnail photos of a particular facility. It should be noted that photos/videos can be quickly viewed, adjusted, added/removed, rotated, edited, etc., to ensure that the best photos/videos are associated with a project. Additionally, the order in which the thumbnails are presented can be modified, and the images can be enlarged simply by clicking on the image.

FIG. 45 illustrates another screen shot showing the "Asset Photos" button that allows a user to take a photo or video, or to choose an existing photo or video. The user can (or the system can automatically) associate a particular photo or video with a particular facility and/or system. In still another embodiment, the user can append text or audio to either the photo or video by means of an input (VP) device as depicted in FIG. 43.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for generating a facilities report for a property, comprising:
    a system computer comprising a network connection;
    software executing on the system computer to receive a location from global positioning data associated with a mobile device;
    software executing on the system computer to identify a facilities report corresponding to the property located at the location, the facilities report including one or more photos, wherein the facilities report is provided via the network connection;
    software executing on the system computer to receive survey data associated with a mobile device, the survey data provided in an industry standard format;
    software executing on the system computer to receive a new photo related to the survey data, wherein the new photo is associated with the survey data by identifying global positioning system data received from the mobile device that corresponds to the survey data;
    software executing on the system to automatically route the new photo to a location associated with the survey data based on the global position data;
    software executing on the system computer to automatically generate an updated facilities report for the property, the updated facilities report generated based on the survey data and the new photo; and
    software executing on system computer presenting a Graphic User Interface (GUI), wherein the GUI includes a representation of the updated facilities report, the one or more photos, and the new photo.

2. The system according to claim 1, wherein the one or more photos are displayed as a series of thumbnails.

3. The system according to claim 1, wherein a user can associate the new photo with particular facilities systems.

4. The system according to claim 1, wherein the new photo and a photo of the one or more photos are used to compare a condition of particular facilities systems.

5. The system according to claim 1, further comprising: software executing on the system computer to append text or audio to the new photo.

6. The system according to claim 1, wherein the updated facilities report includes characteristics of at least one facilities system, wherein the characteristics include an installation year of the at least one facilities system and an estimated lifetime of the at least one facilities system.

7. The system according to claim 1, wherein the GUI includes action cost information corresponding to an action selected by a user and associated with the updated facilities report.

8. The system according to claim 1, further comprising: software executing on the system computer to automatically route the new photo to one or more locations.

9. The system according to claim 1, wherein the facilities report provided in response to a request from the mobile device.

10. The system according to claim 1, wherein the survey data includes information associated with a status of one or more components of the property.

11. A method comprising:
    receiving a location from global positioning data associated with a mobile device;
    identifying a facilities report corresponding to a property located at the location, the facilities report including one or more photos, wherein the facilities report is provided via a network connection to the mobile device;
    receiving survey data associated with a mobile device, the survey data provided in an industry standard format;
    receiving a new photo related to the survey data, wherein the new photo is associated with the survey data by identifying global positioning system data received from the mobile device that corresponds to the survey data;
    automatically routing the new photo to a location associated with the survey data based on the global position data;
    automatically generating an updated facilities report for the property, the updated facilities report generated based on the survey data and the new photo; and
    software executing on system computer presenting a Graphic User Interface (GUI), wherein the GUI includes a representation of the updated facilities report, the one or more photos, and the new photo.

12. The method of claim 11, wherein the one or more photos are displayed as a series of thumbnails.

13. The method of claim 11, wherein a user can associate the new photo with particular facilities systems.

14. The method of claim 11, wherein the new photo and a photo of the one or more photos are used to compare a condition of particular facilities systems.

15. The method of claim 11, further comprising: appending text or audio to the new photo.

16. The method of claim 11, wherein the updated facilities report includes characteristics of at least one facilities system, wherein the characteristics include an installation year of the at least one facilities system and an estimated lifetime of the at least one facilities system.

17. The method of claim 11, wherein the GUI includes action cost information corresponding to an action selected by a user and associated with the updated facilities report.

18. The method of claim 11, further comprising: automatically routing the new photo to one or more locations.

19. The method of claim 11, wherein the facilities report provided in response to a request from the mobile device.

20. The method of claim 11, wherein the survey data includes information associated with a status of one or more components of the property.

* * * * *